US010112522B2

(12) United States Patent
Tollefson et al.

(10) Patent No.: US 10,112,522 B2
(45) Date of Patent: Oct. 30, 2018

(54) FROZEN CONFECTION KIOSK AND LIQUID-DISPENSING ASSEMBLY FOR USE THEREWITH

(71) Applicant: TIKIZ FRANCHISING, LLC, Boca Raton, FL (US)

(72) Inventors: Brian J. Tollefson, Boca Raton, FL (US); David S. Tollefson, Boca Raton, FL (US)

(73) Assignee: Tikiz Franchising, LLC, Boca Raton, FL (US)

( * ) Notice: Subject to any disclaimer, the term of this patent is extended or adjusted under 35 U.S.C. 154(b) by 124 days.

(21) Appl. No.: 15/163,229

(22) Filed: May 24, 2016

(65) Prior Publication Data

US 2016/0264033 A1    Sep. 15, 2016

Related U.S. Application Data

(63) Continuation-in-part of application No. 13/559,664, filed on Jul. 27, 2012, now Pat. No. 9,352,679.

(51) Int. Cl.
*B60P 3/025* (2006.01)
*A23G 9/28* (2006.01)

(52) U.S. Cl.
CPC ............ *B60P 3/0257* (2013.01); *A23G 9/288* (2013.01)

(58) Field of Classification Search
CPC .......... A23G 9/288; B60R 9/06; B60R 9/065; B60P 3/025; B60P 3/007; B60P 3/0257; B60P 3/205; A01M 7/0075

USPC ..... 296/24.36, 26.09, 22, 21, 24.3; 222/608, 222/132, 144, 146.6
See application file for complete search history.

(56) References Cited

U.S. PATENT DOCUMENTS

| 184,292 A | 11/1876 | Matthews |
| 1,170,712 A | 2/1916 | Trombley |
| 1,327,248 A | 1/1920 | Moody |
| 2,733,094 A | 1/1956 | Carlton |
| 2,973,823 A | 3/1961 | Stentz |
| 2,982,578 A | 5/1961 | Lowe |
| 3,006,487 A * | 10/1961 | Gelli .......................... B60R 5/04 414/522 |
| 3,191,400 A | 6/1965 | Swenson |
| 3,395,503 A | 8/1968 | Grenburg et al. |
| 3,476,295 A | 11/1969 | Telfer |
| 3,753,520 A | 8/1973 | Bodde |

(Continued)

FOREIGN PATENT DOCUMENTS

| CA | 2357142 | 3/2003 |
| DE | 9405207 | 5/1994 |

(Continued)

OTHER PUBLICATIONS

Amy Reinink, How to Start A Food Truck, https://www.entrepreneur.com/article/217941, Jan. 19, 2011, 7 pages.

(Continued)

*Primary Examiner* — Charles P Cheyney
(74) *Attorney, Agent, or Firm* — Sand & Sebolt

(57) ABSTRACT

A kiosk for selling frozen confections such as shaved ice or ice cream may include with a liquid-topping dispenser assembly having liquid-dispensing faucets which are operable by a customer outside the kiosk to dispense liquid toppings onto the frozen confections.

18 Claims, 29 Drawing Sheets

(56) References Cited

U.S. PATENT DOCUMENTS

| | | | |
|---|---|---|---|
| 3,845,891 A | | 11/1974 | Becher |
| 3,887,132 A | | 6/1975 | Widmer |
| 3,934,924 A | * | 1/1976 | Diliberti .................. B60P 3/341 |
| | | | 108/44 |
| 4,076,349 A | | 2/1978 | Gettleman et al. |
| 4,089,554 A | | 5/1978 | Myers |
| 4,225,059 A | | 9/1980 | Kappos |
| 4,288,034 A | | 9/1981 | Widmer et al. |
| 4,359,073 A | | 11/1982 | de Stoutz |
| 4,375,306 A | | 3/1983 | Linder |
| 4,456,149 A | | 6/1984 | Sciortino |
| 5,114,120 A | | 5/1992 | Bartelt et al. |
| 5,154,317 A | | 10/1992 | Roppolo, III |
| 5,263,467 A | | 11/1993 | Jones |
| 5,307,957 A | | 5/1994 | Carlsson et al. |
| 5,375,767 A | | 12/1994 | Thorstensson |
| 5,390,834 A | | 2/1995 | Bitter et al. |
| 5,452,825 A | | 9/1995 | Comstock et al. |
| 5,518,156 A | * | 5/1996 | Lehman ................... B60N 3/16 |
| | | | 224/281 |
| 5,564,597 A | | 10/1996 | Koorse et al. |
| 5,711,073 A | | 1/1998 | Tippmann et al. |
| 6,189,944 B1 | | 2/2001 | Piche |
| 6,701,913 B1 | | 3/2004 | LeDuc et al. |
| 6,814,383 B2 | | 11/2004 | Reed et al. |
| 7,044,335 B2 | | 5/2006 | Aguirre et al. |
| 7,152,812 B1 | | 12/2006 | Johnson |
| 7,159,917 B2 | * | 1/2007 | Haaberg ................... B60P 1/003 |
| | | | 224/403 |
| 7,364,050 B2 | | 4/2008 | Guard |
| 7,413,132 B1 | | 8/2008 | Bogart et al. |
| D580,071 S | | 11/2008 | Evans et al. |
| 7,591,404 B2 | | 9/2009 | LeDuc et al. |
| 7,669,740 B2 | | 3/2010 | Saunders et al. |
| D633,007 S | | 2/2011 | Evans |
| 8,157,136 B2 | | 4/2012 | Lamb et al. |
| 8,231,036 B2 | | 7/2012 | Campbell et al. |
| 8,672,200 B2 | | 3/2014 | O'Hare |
| 8,844,994 B2 | | 9/2014 | White et al. |
| 8,925,777 B1 | * | 1/2015 | Casucci .................. B60R 9/065 |
| | | | 224/404 |
| 9,321,387 B2 | | 4/2016 | Lamb |
| 9,668,498 B2 | | 6/2017 | Rupp |
| 2004/0256872 A1 | | 12/2004 | Piper et al. |
| 2008/0083352 A1 | * | 4/2008 | Tovani .................. A47B 83/04 |
| | | | 108/44 |
| 2009/0078724 A1 | | 3/2009 | Lamb et al. |
| 2010/0001029 A1 | * | 1/2010 | Tai ......................... B60R 5/041 |
| | | | 224/499 |
| 2014/0239020 A1 | | 8/2014 | Lamb |
| 2016/0264033 A1 | | 9/2016 | Tollefson et al. |

FOREIGN PATENT DOCUMENTS

| | | |
|---|---|---|
| DE | 29506844 | 6/1995 |
| DE | 19905769 | 8/2000 |
| DE | 202004008104 | 8/2004 |
| DE | 102013010115 | 12/2014 |
| JP | H0826018 | 1/1996 |
| JP | H1159260 | 3/1999 |
| JP | 3162590 | 5/2001 |
| WO | 200023299 | 4/2000 |
| WO | 2013014692 | 1/2013 |

OTHER PUBLICATIONS

Red Hook Lobster Pound DC: First Look with Photos, https://capitalspice.wordpress.com, Aug. 13, 2010, 4 pages.

"Car Wash Equipment." by Martin Mobile Fleet Wash Systems. N.p., n.d. Web. Jan. 31, 2014. <http://www.hotfrog.com/Companies/Martin-Mobile-Fleet-wash-Systems/car-wash-equipment-236538>.

Excalabar Staircase Offroad Camper Trailer, http://web.archive.org/web20120802023441/http://www.jimboombacampertrailers.com.au/product/2224/Excalabar-Staircase-Offroad-Camper-Trailer, 3 pages, Archived Aug. 2, 2012.

Jimboomba Camper Trailers, Trailer Optional Extra's, http://web.archive.org/web/20120907015647/http://www.jimboombacampertrailers.com.au/product/2226/Trailer-Optional-Extras, 5 pages, Archived Sep. 7, 2012.

* cited by examiner

FROZEN CONFECTION KIOSK AND LIQUID-DISPENSING ASSEMBLY FOR USE THEREWITH

CROSS REFERENCE TO RELATED APPLICATION

This application is a continuation-in-part of U.S. patent application Ser. No. 13/559,664, filed Jul. 27, 2012, the disclosure of which is incorporated herein by reference.

BACKGROUND

1. Technical Field

The technical field relates generally to a kiosk for dispensing food and/or drink items, especially frozen confections such as ice cream, snow cones, shaved ice and the like. More particularly, the technical field relates to such a kiosk and a liquid topping dispenser assembly which may be accessed by customers outside the kiosk.

2. Background Information

Stationary and mobile kiosks are well known for selling various frozen confections, such as ice cream, shaved ice, snow cones, beverages and so forth. If the kiosk is set up for selling ice cream, there are typically either containers of ice cream which can be scooped into a cone or dish, or soft ice cream makers within the kiosk whereby a person within the kiosk may prepare the ice cream confection for dispensing through a service window upon payment for the item. A kiosk may also be set up to create snow cones, or shaved ice, also known as Italian ice. A liquid topping dispenser may be inside the kiosk for dispensing a sweet liquid topping onto the crushed ice or shaved ice in order to produce the confection which is dispensed through the service window. It is also known to provide a liquid topping dispenser assembly which is accessible from outside the kiosk so that the customer can apply the liquid topping to the ice cream, crushed ice, shaved ice, etc. However, there is still room for improvement in the art.

SUMMARY

In one aspect, an apparatus may comprise a kiosk comprising a sidewall defining an interior chamber having a size suitable for accommodating a person therein; a frozen confection forming device in the interior chamber; a serving window formed through the sidewall and configured to allow a frozen confection to pass through the window from the interior chamber to outside the kiosk; a track extending adjacent the sidewall; a carriage which engages and is movable back and forth along the track; and a liquid-topping dispenser assembly which comprises a support and a plurality of liquid-dispensing faucets carried by the support and operable by a person outside the kiosk; wherein the dispenser assembly is mounted on the carriage so that the dispenser assembly is movable back and forth with the carriage.

In another aspect, an apparatus may comprise a kiosk comprising a sidewall defining an interior chamber having a size suitable for accommodating a person therein; a frozen confection forming device in the interior chamber; a serving window formed through the sidewall and configured to allow a frozen confection to pass through the window from the interior chamber to outside the kiosk; a track extending inside the sidewall; a carriage comprising a carriage frame having a dispenser mounting portion and a roller mounting portion, wherein a roller is rotatably mounted on the roller mounting portion and rollingly engages the track inside the sidewall; and a liquid-topping dispenser assembly which comprises a support and a plurality of liquid-dispensing faucets carried by the support and operable by a person outside the kiosk, wherein the dispenser assembly is mounted on the carriage so that the dispenser assembly is movable back and forth with the carriage while the dispenser assembly is outside the sidewall.

In another aspect, an apparatus may comprise a kiosk comprising a sidewall defining an interior chamber having a size suitable for accommodating a person therein; a frozen confection forming device in the interior chamber; a serving window formed through the sidewall and configured to allow a frozen confection to pass through the window from the interior chamber to outside the kiosk; a track; a carriage comprising a first portion and a second portion; a liquid-topping dispenser assembly which comprises a support and a plurality of liquid-dispensing faucets carried by the support and operable by a person outside the kiosk, wherein the dispenser assembly is mounted on the carriage so that the dispenser assembly is movable with the carriage; an elongated slot formed in the sidewall; and a cutout formed in the sidewall; wherein the carriage is movable back and forth along the track so that the first portion of the carriage is movable from a first position of the first portion inside the sidewall through the cutout to a second position of the first portion outside the sidewall and so that the second portion of the carriage is movable from a first position of the second portion inside the slot to a second position of the second portion outside the slot.

BRIEF DESCRIPTION OF THE SEVERAL VIEWS OF THE DRAWINGS

One or more sample embodiments are set forth in the following description, shown in the drawings and particularly and distinctly pointed out and set forth in the appended claims.

Similar numbers refer to similar parts throughout the drawings.

DETAILED DESCRIPTION

Figure 1:
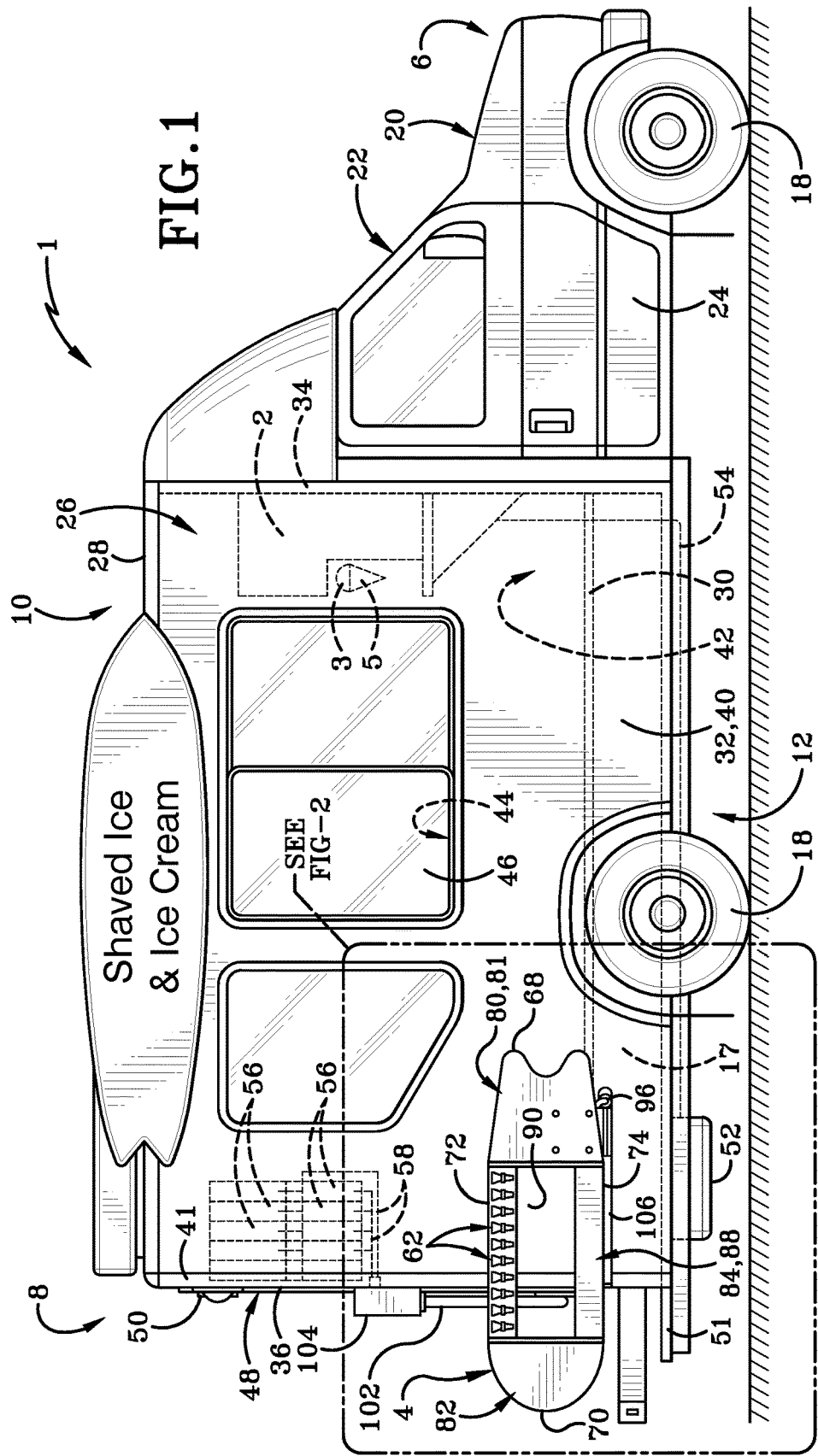
FIG. 1 is a right side elevational view of a kiosk shown as a mobile vehicle with a liquid topping dispenser assembly mounted adjacent the rear of the vehicle.

A kiosk is illustrated generally at 1 in FIG. 1. Although kiosk 1 is illustrated in the Figures as a motorized mobile vehicle, it will be understood by one skilled in the art that kiosk 1 may also represent a non-motorized wheeled vehicle, such as a trailer, or a non-wheeled kiosk, which may be seated directly on the ground and either be a permanent structure or one which is portable by, for instance, being picked up by a separate mobile vehicle. Kiosk or vehicle 1 may be configured to produce frozen confections 3 as discussed in the Background section of the present application such as to be contained in a container 5, such as a cup, cone, dish or the like. Kiosk 1 may be configured with a frozen confection forming device 2 inside the kiosk and a liquid-topping dispenser assembly 4 which is configured to be operated by people/customers outside the kiosk. Thus, vehicle 1 may be configured for an operator or other person within the kiosk to produce a frozen confection such as ice cream, a snow cone, shaved ice and the like and dispense it to a customer outside the vehicle so that the customer may dispense the liquid topping with dispenser 4 onto the crushed ice, shaved ice, or frozen confection of any sort.

Vehicle 1 has a front 6 and a back 8 defining therebetween a longitudinal direction of the vehicle or kiosk, a top 10, a bottom 12, and left and right sides 14 and 16 (FIG. 5) defining therebetween an axial direction of the vehicle or kiosk. Where kiosk 1 is in vehicular form, the longitudinal direction may also represent the travel direction of the vehicle. Vehicle 1 may include a chassis or vehicle frame 17 and ground engaging wheels 18 which are rotatably mounted on frame 17. Wheels 18 may include a front set adjacent front 6 and a rear set generally adjacent back 8. Vehicle 1 further includes an engine compartment 20 housing an engine (not shown) which drives rotation of at least some of the wheels in order to cause the vehicle to travel. Vehicle 1 may further include a cab 22 with cab doors 24 on the driver side and passenger side (left and right sides of vehicle 1/cab 22), and a cargo body or box 26 extending from adjacent the back of cab 22 to adjacent back 8 of the vehicle.

Body 26 may include essentially horizontal and rectangular top and bottom walls 28 and 30 and a sidewall 32 secured to and extending between the top and bottom walls 28 and 30. Body 26/walls 28, 30 and 32 may be rigid. Sidewall 32 is an upwardly extending wall which may be an essentially vertical wall and which may include essentially vertical front and back walls 34 and 36 which may be essentially parallel to one another, which are rectangular or square as viewed from the back or front, and which extend axially along respective vertical axial planes. Sidewall 32 may further include essentially vertical left and right walls 38 and 40 which may be essentially parallel to one another and perpendicular to front and back walls 34 and 36. Left and right walls 38 and 40 extend longitudinally and may lie along respective longitudinal vertical planes. Walls 34, 36, 38 and 40 may be rigid and fixed with respect to one another and may be joined to form respective essentially vertical corners. More particularly, the rear end of left wall 38 and a left side of back wall 36 may intersect at an essentially vertical left rear corner 39. Similarly, the rear end of right wall 40 and the right side of back wall 36 may intersect at an essentially vertical right rear corner 41. Each of corners 39 and 41 may extend from adjacent top wall 28 to adjacent and lower than bottom wall 30. Top wall 28, bottom wall 30 and sidewall 32 may define therewithin an interior chamber 42. The cargo body 26 may have a generally box shaped or parallelepiped configuration. Bottom wall or floor 30 may be spaced upwardly of the bottom of sidewall 32 including upward of the bottom of walls 34, 36, 38 and 40 so that lower portions of walls 32, 34, 36, 38 and 40 may extend downward lower than bottom wall 30. Bottom wall 30 may, for instance be at about the same height as the bottom of back door 48 and the bottom of the doorway which door 48 covers when closed.

Sidewall 32 may have an above-floor portion 31 and a below-floor or subfloor portion 33 such that portion 31 extends upwardly above or higher than floor 30 and portion 33 extends downwardly below or lower than floor 30.

Above-floor portion 33 may partially define interior chamber 42, which may extend upwardly from the top of floor 30. Subfloor portion 33 may surround or partially define a subfloor space 35 which may be lower than and directly below floor 30 and interior chamber 42, which may extend downwardly from the bottom of floor 30 and which may be rearward of the rear set of wheels 18. Space 35 may have a back end 37 which may define or serve as a rear entrance opening of space 35. Rear end/entrance opening 37 may be adjacent back wall 36 and may be defined by an opening or cutout 43 formed in back wall 36. Cutout 43 and entrance opening 37 may be entirely adjacent right wall 40 and right rear corner 41 and may be entirely to the right of a back door 48 of vehicle 1. Cutout 43 may be adjacent and extend higher than a bumper 51, and may, for instance, be square or rectangular as viewed from the rear of kiosk 1. Space 35 may be a right space and cutout 43 may be a right cutout which are associated or used with right dispenser assembly 4. Alternately or in addition, space 35 may be a left space and cutout 43 may be a left cutout which are associated or used with left dispenser assembly 4, whereby cutout 43 and entrance opening 37 may be entirely adjacent left wall 38 and left rear corner 39 and may be entirely to the left of back door 48.

Figure 5:
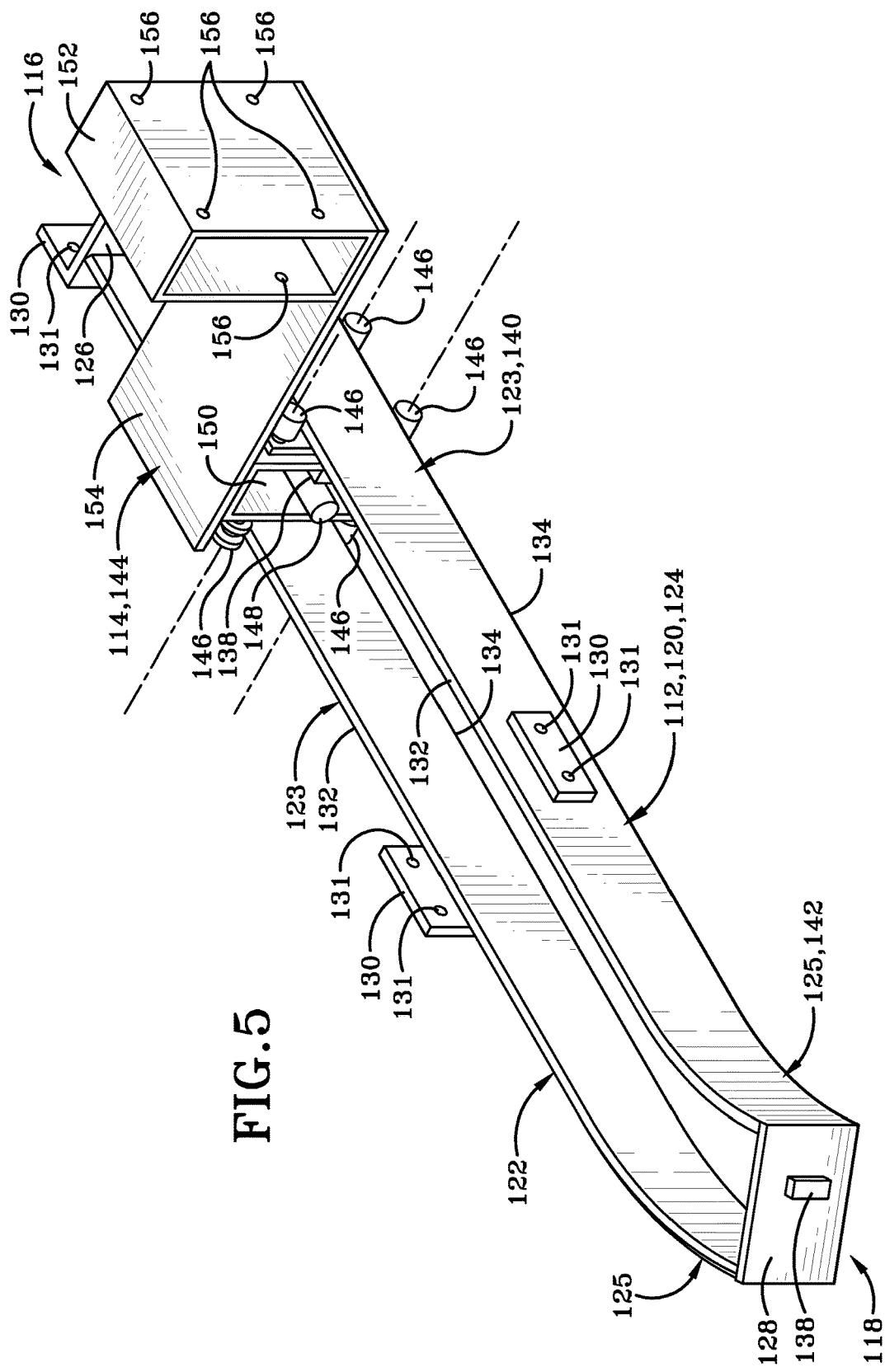
FIG. 5 is an enlarged perspective view of the right track and carriage.
Figure 6:
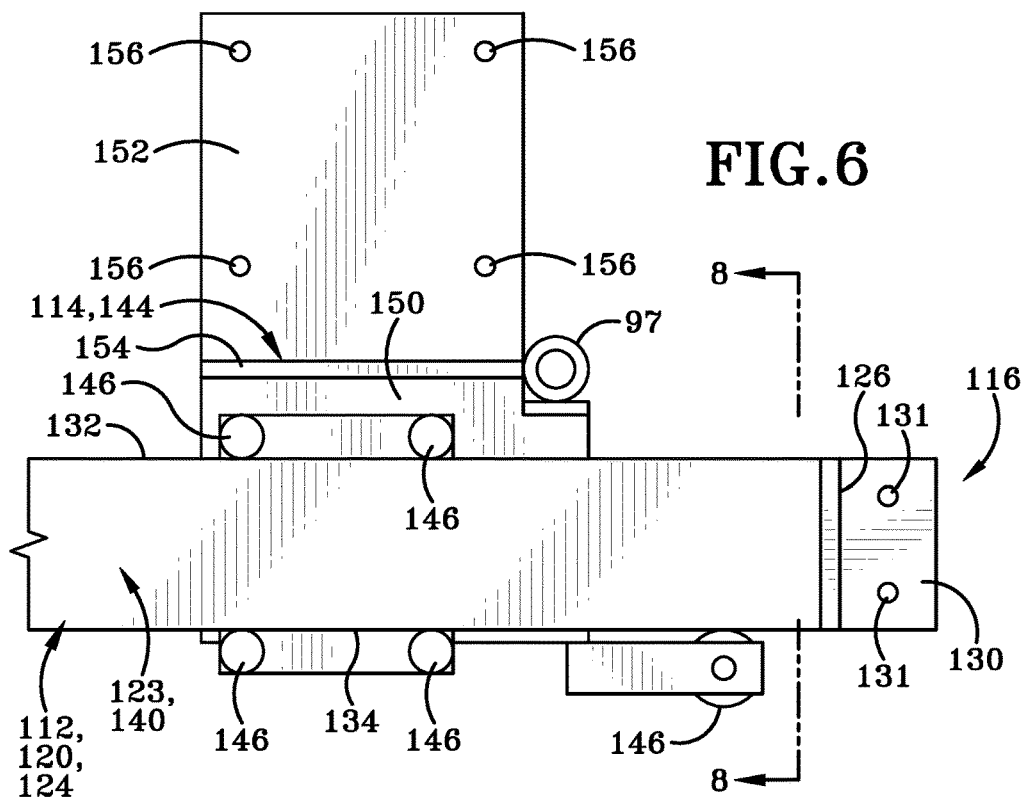
FIG. 6 is an enlarged right side elevation view of the carriage assembly and a front portion of the track.
Figure 7:
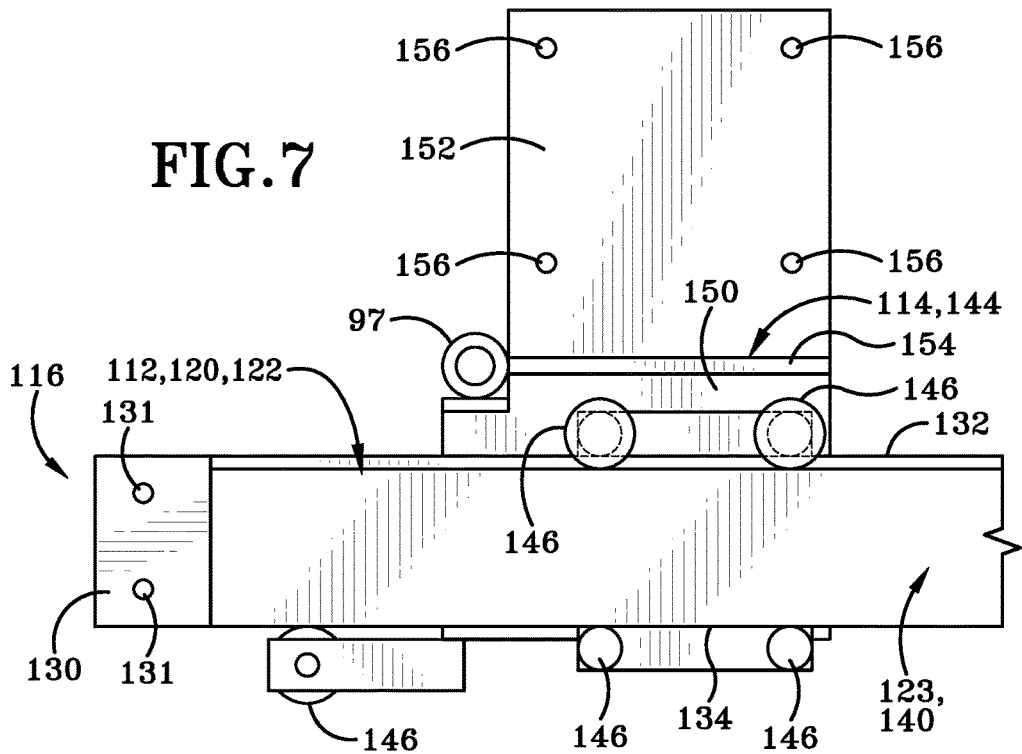
FIG. 7 is an enlarged left side elevation view of the carriage assembly and the front portion of the track.

An opening or service window 44 may be formed through right wall 40 with a panel, door or window pane 46 mounted to move between an open and closed position for respectively opening and closing serving window 44. An additional service window 44 and corresponding panel, door or window pane may be positioned along the left side of the vehicle alternatively or in addition to the one along the right side, as illustrated in FIG. 5. Back door 48 may be movable between a closed position and an open position (dashed lines in FIG. 5). Back door 48 may be mounted on hinges 50 in order to pivot about a vertical axis between the open and closed positions, whereby a person may enter and exit the interior chamber 42 when back door 48 is open. Vehicle 1 may further include a rigid back bumper or step 51 which may be an essentially horizontal axially elongated member which may extend rearward of or be entirely rearward of back wall 36. Bumper 51 may extend from adjacent the bottom of left rear corner 39 to adjacent the bottom of right rear corner 41 and may extend rearwardly from adjacent the bottom of back wall 36. Step 51, which may be rigidly secured to the vehicle frame, may thus be configured for a person to step up onto when entering the inside of the kiosk through back door 48.

A waste liquid reservoir or container 52 may be mounted on vehicle 1 adjacent the back end thereof along the bottom of the frame, although the specific position may vary. Container 52 may also be within or separate from the vehicle, for instance sitting on the ground. A drain line 54 may be connected at one end to forming device 2 with another end thereof connected to container 52 or a separate waste liquid container. A plurality of liquid topping containers 56 may be disposed within interior chamber 42 and contain various types of potable liquid toppings (typically having different flavors) which can be dispensed through dispenser assembly 4. Ten of the containers 56 are shown in FIG. 1, although this number may vary. Feed lines 58 may be provided which may be in the form of flexible hoses or tubes for providing fluid communication between the respective containers 56 and dispenser assembly 4. Thus, one end of each feed line 58 is connected to an outlet of container 56.

Figure 2:
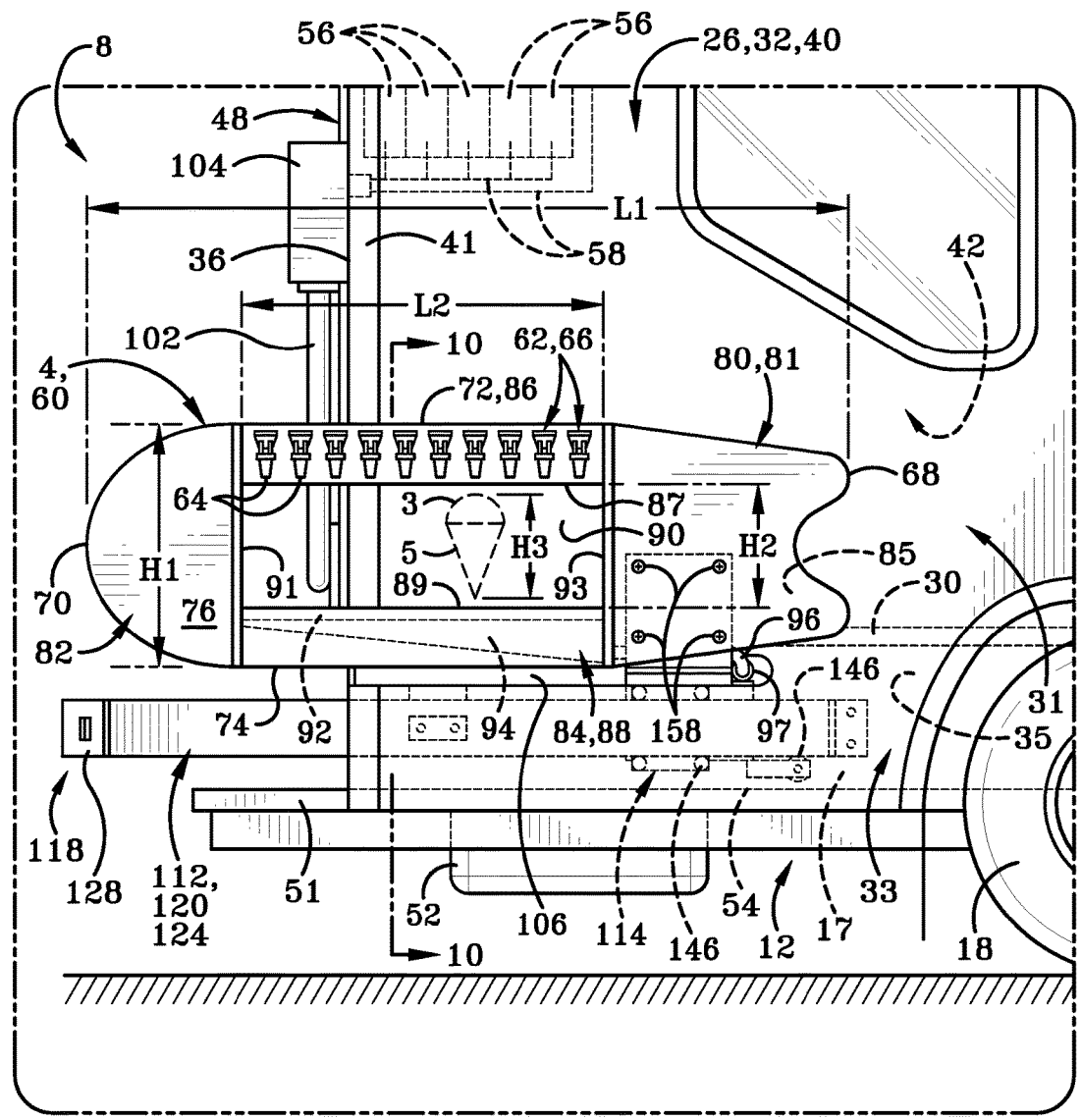
FIG. 2 is an enlarged right side elevational view of a right rear portion of the kiosk/vehicle and liquid topping dispenser assembly.
Figure 2A:
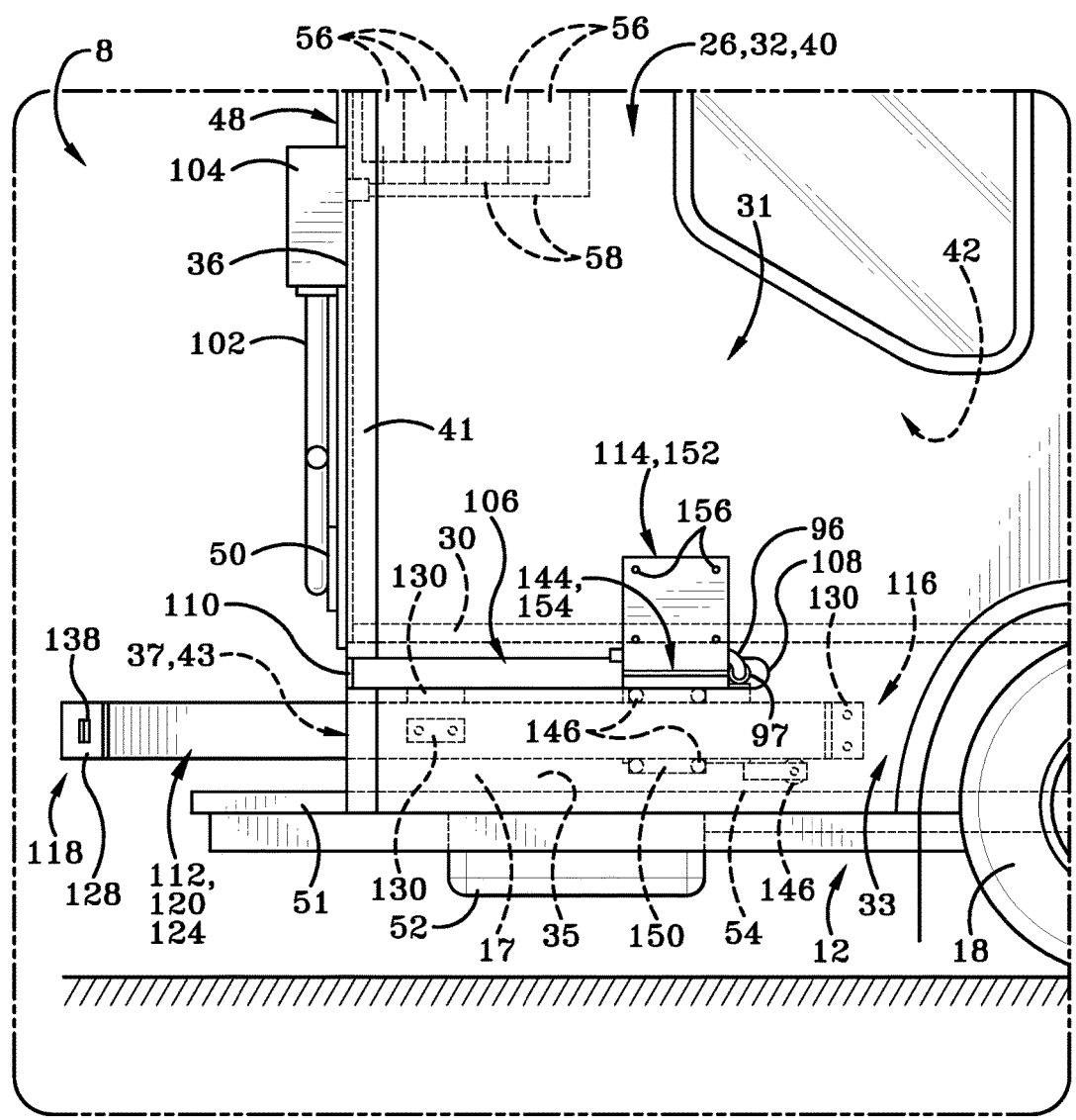
FIG. 2A is a view similar to FIG. 2 with the dispenser assembly removed.

FIG. 2 shows a right dispenser assembly 4 mounted on vehicle 1, while FIG. 5 also shows a left dispenser assembly 4 mounted on vehicle 1. The right dispenser assembly 4 may be mounted adjacent the right rear corner 41, and the left assembly 4 may be mounted adjacent the left rear corner 39. The left dispenser assembly 4 may be mounted in the same manner as the right dispenser assembly 4 except in a mirror image fashion such that the left dispenser assembly 4 is generally to the left of left wall 38.

With primary reference to FIG. 2, the right dispenser assembly will first be described. It will be understood that much of the description of the right assembly 4 also applies to the left assembly 4 although the two dispenser assemblies may be mirror images. The left and right assemblies 4 may also be mounted in different locations such that components that extend to the right and left with respect to the right assembly 4 may extend respectively to the left and right with respect to the left assembly 4, or surfaces which may be leftward facing and rightward facing with respect to the right assembly 4 may respectively be rightward facing and leftward facing with respect to the left assembly 4. The various similarities and differences between the left and right dispenser assemblies 4 should be evident from the Figures even if not described explicitly herein.

Right dispenser assembly 4 may include a rigid dispenser support 60 and a plurality of faucets 62 carried thereby wherein each faucet 62 includes a spout 64 and a control 66 which is manually operable and may be in the form of a button or handle which is movable from a closed position to an open position by manual engagement by a person outside the kiosk. Dispenser assembly 4 may be mounted adjacent and entirely external to box 26 and kiosk 1. Dispenser assembly 4 may be movably attached to kiosk/vehicle 1 so that assembly 4 is movable with respect to sidewall 32 and its various walls 34, 36, 38 and 40. Assembly 4 may be movable between multiple positions, including a first or home position (FIGS. 1-3) and a second position (FIGS. 11-12) which may also be referred to respectively as stored and dispensing positions or forward and rearward positions or undeployed and deployed positions. It is noted that although the first or forward position may be referred to as a stored position, dispenser assembly 4 may be configured so that a customer may dispense liquid toppings from assembly 4 in the stored position as well as the dispensing position. Thus, faucets 62 of assembly 4 may be open or accessible to a customer outside kiosk 1 in any of the positions of assembly 4. Assembly 4 may be spaced outwardly from body 26/sidewall 32 so that assembly 4 is out of contact with sidewall 32 in all positions.

Support 60 has a first or front end 68 and a distal second or rear end 70 such that support 60 and assembly 4 may be longitudinally elongated from front end 68 to rear end 70. Ends 68 and 70 define therebetween a horizontal longitudinal length L1 which may be in a range of about 3 or 4 feet to about 6 feet and may be on the order of about 5 feet. Given that dispenser assembly 4 may have a substantial length and that it is spaced outwardly of body 26 of kiosk/vehicle 1, assembly 4 may provide a visual display which may be a customer attracting feature, especially given a specific shape which customers may come to recognize as indicative of the given vendor.

Support 60 has a top 72 and a bottom 74 defining therebetween a vertical distance or height H1 (FIG. 2) which may be, for instance, no more than ½ length L1 or ⅓ length L1. Height H1 may be approximately ⅓ of length L1 or slightly less. Support 60 has first and second surfaces or sides 76 and 78 defining therebetween a horizontal thickness T (FIG. 3) which may be, for example, no more than one-half (½) height H1 or one-third (⅓) height H1. Thickness T may be about one-fourth (¼) height H1. Each of sides 76 and 78 may be an essentially flat vertical surface extending from adjacent rear end 70 to adjacent front end 68 and from adjacent top 72 to adjacent bottom 74. Side or surface 76 may be a rightward facing right side or surface, and side or surface 78 may be a leftward facing left side or surface such that thickness T is an axial thickness.

Support 60 may include a first or front segment 80, a second or rear segment 82 and a central or intermediate segment 84 connected to and extending between segments 80 and 82. Front segment 80 may include first and second walls 81 and 83 which may be flat, vertical, parallel and spaced from one another to define therebetween an essentially vertical open space 85. Intermediate segment 84 may include an essentially horizontal upper arm 86 and an essentially horizontal lower arm 88 each of which extends between and is secured to segments 80 and 82. Left surface 78 of support 60 may face and be parallel to and spaced from right wall 40 and the rightward facing surface thereof. Right surface 76 of support 60 may face away from and be parallel to and spaced from right wall 40 and the rightward facing surface thereof.

A set of faucets 62 may be mounted on upper arm 86 and extend outwardly therefrom in a first direction (to the right in this case) within a recess generally along side 76. It may be that no portion of any of faucets 62 extends outwardly beyond side 76 (outwardly to the right beyond right side/surface 76). The various faucets 62 may be longitudinally spaced from one another along the length of assembly 4/support 60 at regular intervals so that one of the faucets 62 is a rearmost faucet and the remaining faucets 62 are sequentially forward of and further away therefrom. Thus, faucets 62 may be equally spaced along the length of support 60. Each of faucets may be the same horizontal axial or normal distance from the right side or surface of right wall 40.

Support 60 may define a rectangular through opening 90 extending from first side 76 to second side 78. More particularly, opening 90 may be defined by an essentially horizontal downwardly facing bottom surface 87 of upper arm 86, an essentially horizontal upwardly facing top surface 89 of lower arm 88, an essentially vertical forward facing surface 91 of rear segment 82 and an essentially vertical rearward facing surface 93 of front segment 80. Surfaces 91 and 93 may be essentially parallel and face one another and define therebetween a horizontal length L2 which may be at least ¼ length L1 or at least ⅓ length L1. Length L2 may be about and slightly less than ½ length L1. The respective rear and front ends of upper and lower arms 86 and 88 may be secured respectively to surfaces 91 and 93, whereby the rear and front ends of each arm may define therebetween length L2 of each arm 86 and 88, whereby said length may be the same as the length of opening 90. Bottom and top surfaces 87 and 89 may define therebetween a vertical distance or height H2 which may be about 12 inches although this may vary somewhat and may more particularly be configured to allow the frozen confection and its container to pass through opening 90 from one side to the other side of support 60. Thus, the confection 3 and its cone, cup or dish 5 together may have as measured from top to bottom a height H3 which is less than height H2. Opening 90 may also be directly to the right of right wall 40.

A flow through structure such as a grate 92 or a plate with multiple apertures extending from the top to the bottom may be disposed within a cavity defined by lower arm 88 along the top of arm 88. An angled or inclined drip pan or flow pan 94 may also be disposed within this cavity of arm 88 and may, for example, angle downward and forward toward front end 68 (or downward and rearward toward rear end 70). Thus, any drips or overflow liquid coming from faucets 62 which is not dispensed on the frozen confection or a container or the like may drip down or fall onto and through the flow through structure 92 and onto drip pan 94, along which the liquid may flow, for instance, downwardly toward front end 68 (or rear end 70) and into a drain hose 96 having one end connected to the drip pan adjacent its lower end and another end in fluid communication with container 52 for emptying the waste liquid into container 52. A protective collar or sleeve 97 may be mounted on hose 96 such that hose 96 is received in and passes through a through passage defined by sleeve 97.

A hose bundle 102 made up of hoses 58 may extend from dispenser assembly 4 to a hose cover or hose junction box 104 which may be rigidly secured to back wall 36. Thus, one end of each hose 58 may be connected to a corresponding faucet 62 whereby hoses 58 may provide respective fluid communication between the respective containers 56 (FIG. 1) and faucets 62. It is noted that inasmuch as there are ten faucets 62 shown in the figures, there may accordingly be ten hoses 58 connected respectively thereto as well as ten topping containers 56 connected respectively to the opposite ends of hoses 58. Hose cover 104 may have a removable panel or openable door which allows access to hoses 58 within the interior chamber defined by cover 104. Each hose 58 may include two segments which are connected to one another by a quick disconnect connection which may be disposed within box 104. Hoses 58 may extend through a hole (covered by box 104) which may be formed in back wall 36 or one of the left and right walls of body 26 such that the hole extends from outside the vehicle/kiosk 1/body 26 to interior chamber 42.

Figure 3:
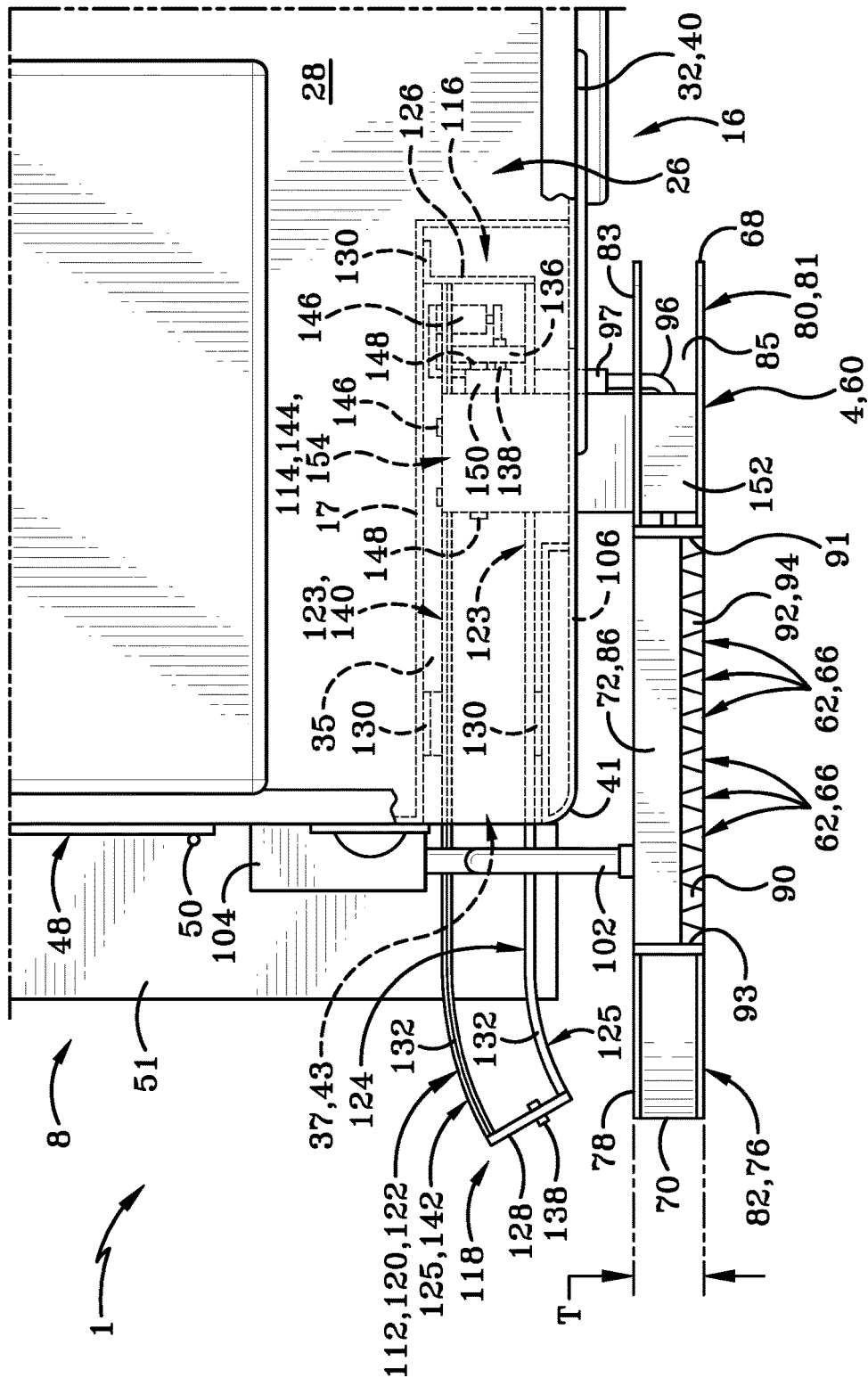
FIG. 3 is an enlarged top plan view of a right rear portion of the kiosk/vehicle and dispenser assembly.
Figure 4:
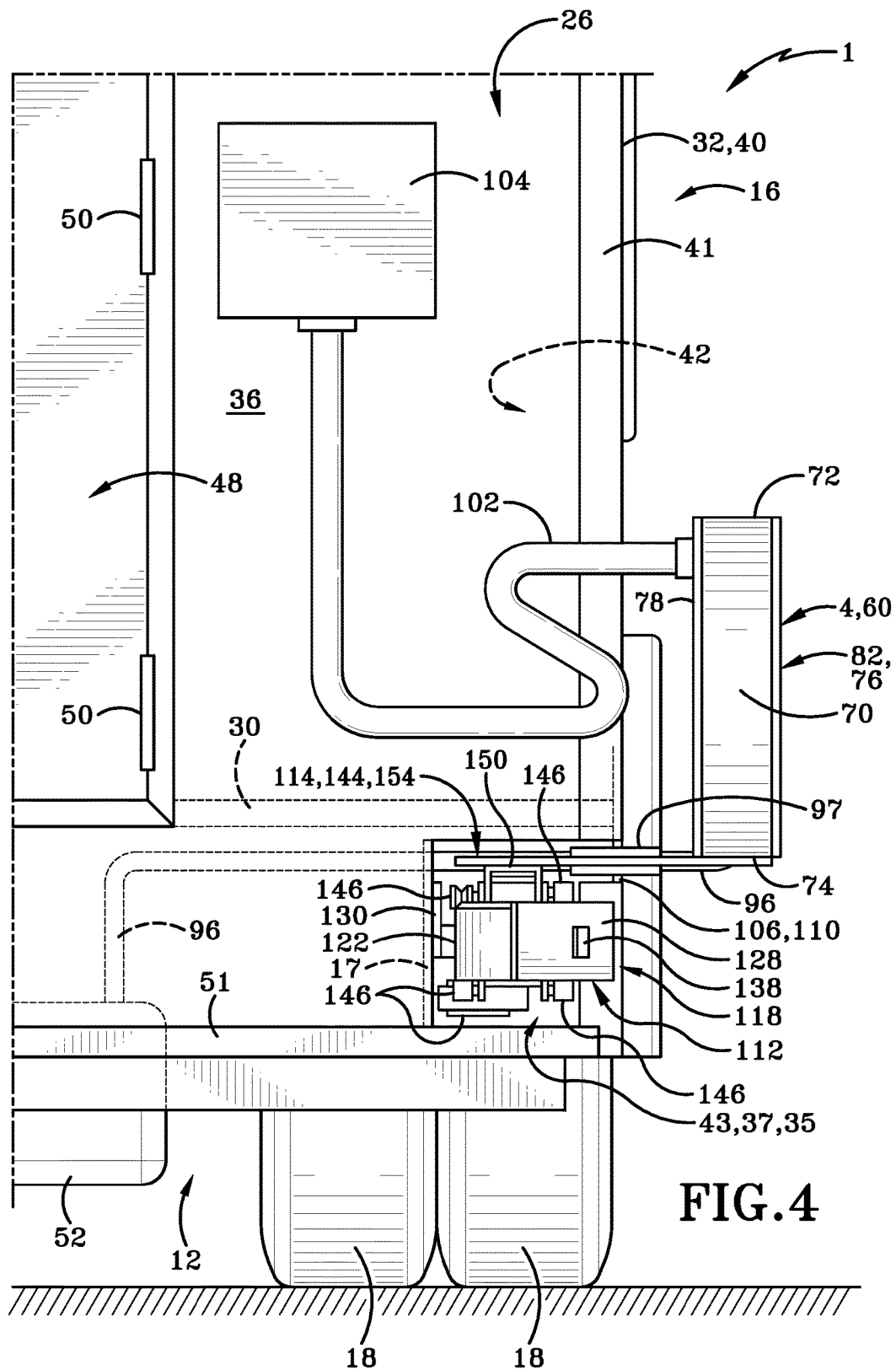
FIG. 4 is an enlarged rear elevation view of a right rear portion of the kiosk/vehicle and dispenser assembly.

With primary reference to FIGS. 2-4, sidewall 32 may define an elongated slot 106 which may have a first/closed end 108 and a second/open end 110 which may be respectively front and back ends. Slot 106 may be longitudinally elongated, that is, elongated in the longitudinal direction. Slot 106 may be formed in subfloor portion 33 whereby slot 106 may be entirely lower than floor 30 and may be horizontal and parallel to floor 30 from end 108 to end 110. Slot 106 may be entirely rearward of the rear set of wheels 18. Slot 106 may extend from the inner surface of sidewall 32 to the outer surface of sidewall 32 and communicate with subfloor space 35 and atmosphere outside sidewall 32 and thereby provide a passage from space 35 to this external atmosphere. Open end/rear entrance opening 110 of slot 106 may be adjacent back wall 36, rear end/entrance opening 37 and cutout 43. End 110 may be said to communicate with entrance opening 37. Slot may terminate at its front closed end 108 and at its rear open end 110 at or adjacent cutout 43 and back end/entrance opening 37. Slot 106 may be a right slot which is formed in right wall 40 and thus extend from the inner to the outer surface thereof. Right slot 106 may thus be associated with or used with right dispenser assembly 4. Slot 106 may be a left slot which is formed in left wall 38 and thus extend from the inner to the outer surface thereof. Left slot 106 may thus be associated with or used with left dispenser assembly 4.

Figure 11:
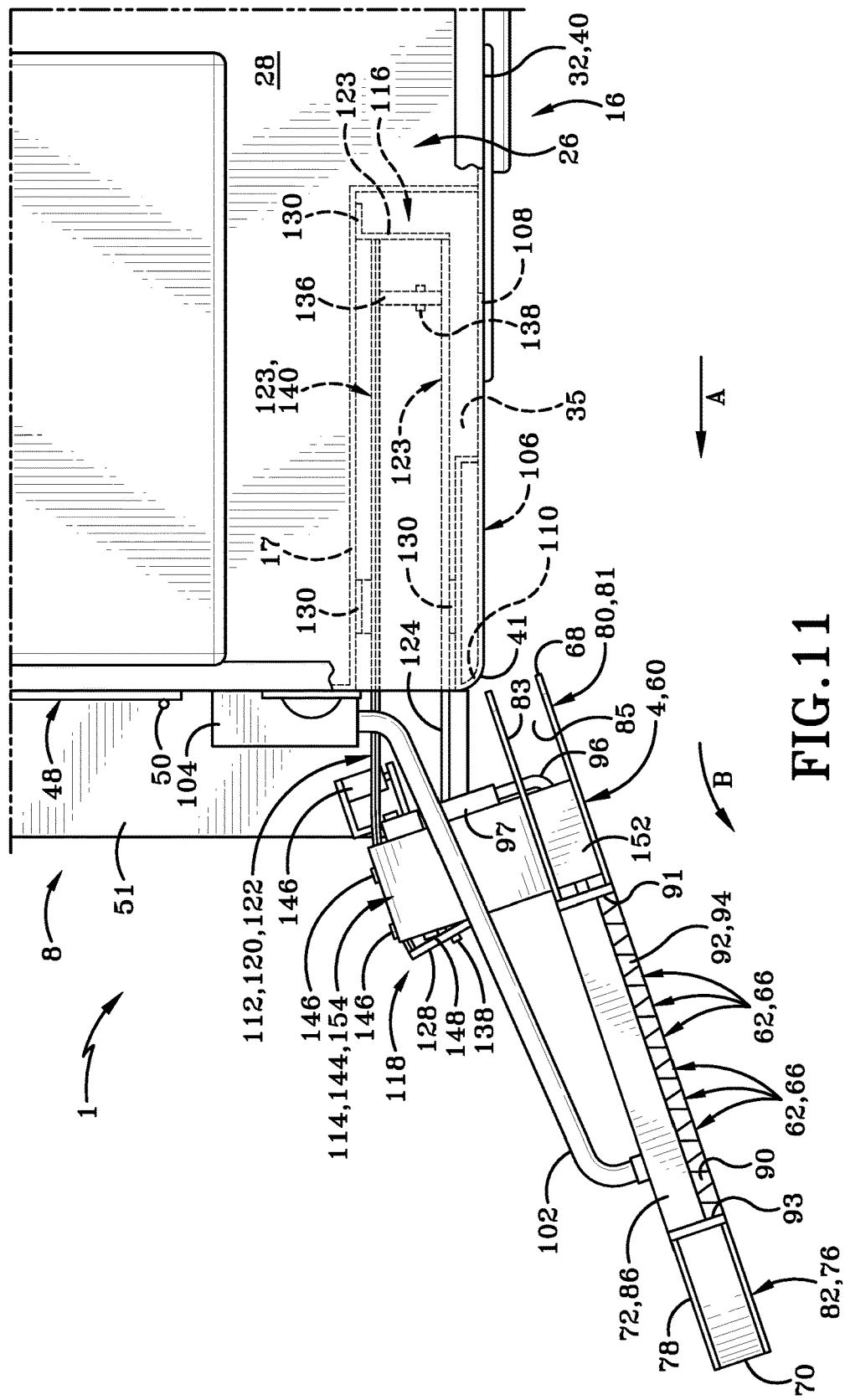
FIG. 11 is an enlarged top plan view of a right rear section of a kiosk showing the right dispenser assembly in the deployed or dispensing position.

Dispenser assembly 4 may be mounted on kiosk 1 via a carriage and track system which may include a track assembly 112 and a carriage assembly 114. With primary reference to FIGS. 5-10, track assembly 112 may have front and back ends 116 and 118 between which assembly 112 may be longitudinally elongated. Assembly 112 may include a longitudinally elongated track 120 extending from adjacent end 116 to adjacent end 118. Assembly 112 may include longitudinally elongated first and second rails 122 and 124, which may be left and right rails. Rails 122 and 124 may have forward straight sections or portions 123 which may be parallel to one another and to left and right walls 38 and 40 and straight as viewed from above (FIG. 11). Rails 122 and 124 may also have rear curved sections or portions 125 which are respectively secured to and extend rearward from straight portions 123. Where assembly 112 is a right track assembly, curved portions 125 may curve rearward and to the right.

Figure 8:
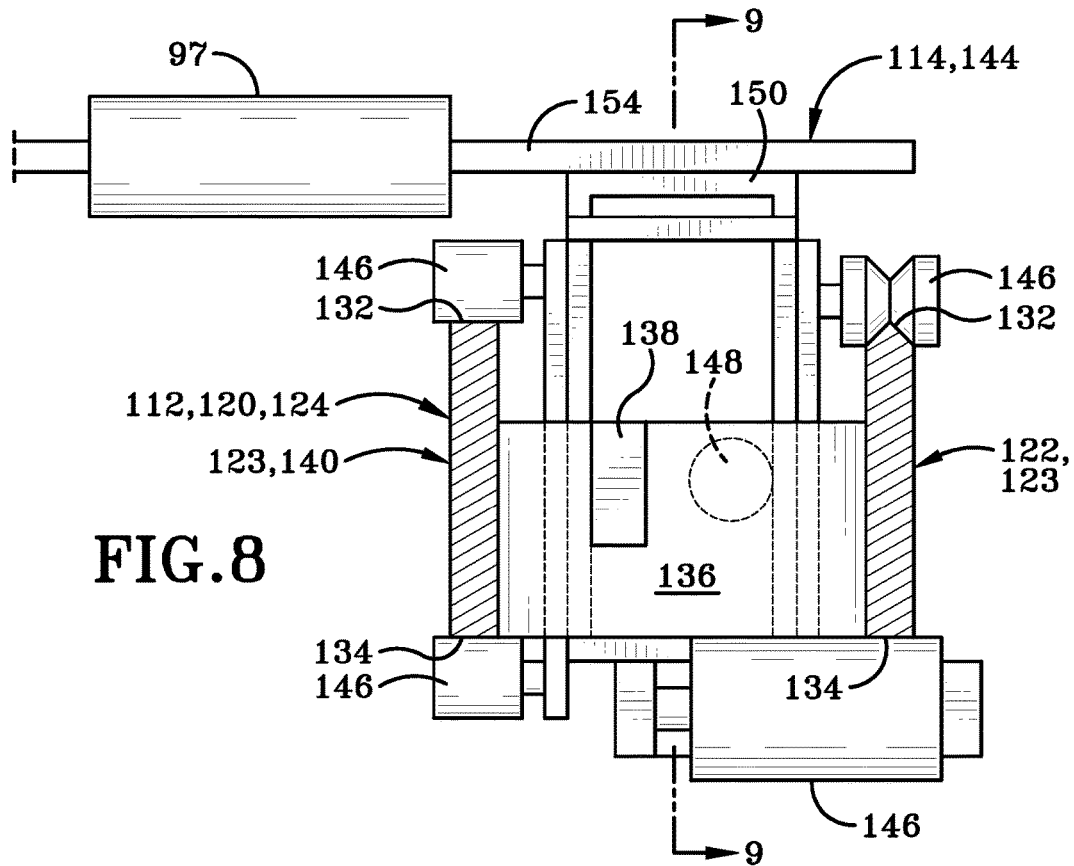
FIG. 8 is an enlarged sectional view taken on line 8-8 of FIG. 6 showing the carriage assembly and the tracks in section.
Figure 9:
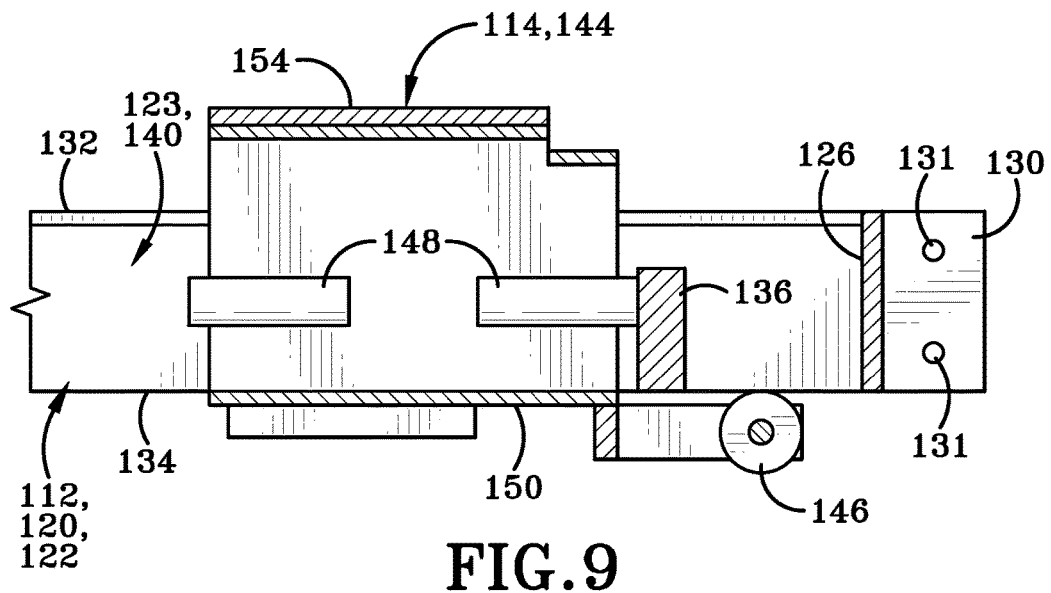
FIG. 9 is a sectional view taken on line 9-9, FIG. 8.
Figure 10:
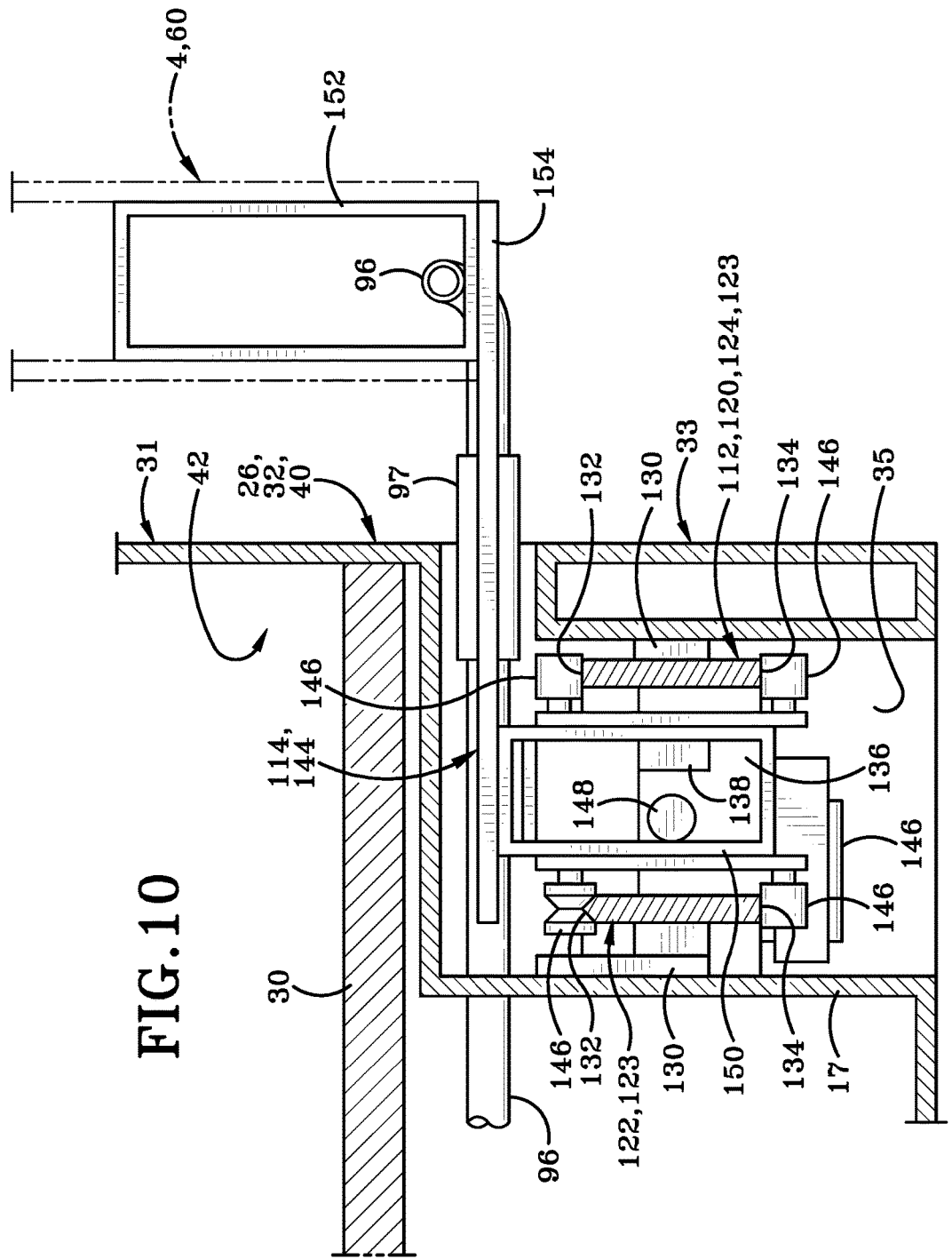
FIG. 10 is an enlarged sectional view taken on line 10-10 of FIG. 2.

Assembly 112 may include front and rear walls 126 and 128 which may respectively be rigidly secured to the front ends and rear ends of rails 122 and 124. Assembly 112 may include mounting flanges 130, which may be secured to rails 122 and 124 and/or front wall 126, and which may define mounting holes 131. Each of rails 122 and 124 may have top and bottom edges 132 and 134, which may respectively be upward facing and downward facing edges. Edges 132 and 134 may be essentially horizontal from adjacent the front end of the given rail to adjacent the back end of the given rail. Edges 132 and 134 may be flat or may be tapered or angled as viewed from the front or back or in section, as best seen in FIG. 8. For instance, one of edges 132 and 134 may be tapered or angled (here, top edge 132 of rail 122) while the others are flat. Top edge 132 of rail 132 may be V-shaped in cross section. Assembly 112 may also include a front stop wall 136 (FIGS. 8, 9, 11) which may extend between and be secured to rails 122 and 124 adjacent the front ends thereof and rearward of front wall 126. Stop wall 136 may serve as a front stop, as noted further below, although other structures may serve as such a stop, e.g., front wall 126. Rear wall 128 may likewise serve as a stop. A latch or catch 138 may be mounted on each of wall 136 and wall 128. Track assembly 112 may have a front portion 140 and a rear portion 142. Front portion 140 may include a front portion or majority of track 120/rails 122 and 124/straight sections 123. Front portion 140 may also include front wall 126, flanges 130, stop wall 136 and front latch 138. Rear portion 142 may include rear portions of straight sections 123, part or all of curved sections 125, rear wall 128 and rear latch 138.

With primary reference to FIGS. 2-4, 10 and 11, track assembly 112 may be secured to frame 17 with front portion 140 within space 35 and rear portion 142 outside space 35. Part or a portion of track assembly 112/track 120 may be within cutout 43. Rear portion 142 may be rearward of and directly behind space 35. Thus, front wall 126, flanges 130, stop wall 136, front latch 138, and a majority of track 120/rails 122 and 124/straight sections 123 may extend or be within space 35; and rear wall 128, rear latch 138, rear portions of straight sections 123, and part or all of curved sections 125 may be outside of and rearward of/directly behind space 35. Flange holes 131 may receive therein fasteners (which may be pins or threaded fasteners such as bolts or screws) which may be used to rigidly secure track assembly 112 to chassis/frame 17 and/or sidewall 32. Flanges 130 may contact frame 17 or sidewall 32 (e.g., left or right walls 38 and 40), and rails 122 and 124 may be spaced from frame 17 and sidewall 32.

Carriage assembly or carriage 114 may have a rigid carriage frame 144, a plurality of rollers 146 rotatably mounted on frame 144 and front and rear carriage bumpers or stop-engaging members 148. Rollers 146 may include upper rollers, lower rollers, front rollers and back rollers, and/or left rollers and right rollers which may all be rotatable about respective axes which may be horizontal and parallel to one another. Frame 144 may include a roller mount portion 150, a dispenser mount portion 152 and a cantilever arm or portion 154 which is secured to and extends between portions 150 and 152. Roller mount portion 150 and dispenser mount portion may each, for example, have a box-like configuration with a pair of parallel vertical walls and a pair of parallel horizontal walls which may be perpendicular to, extend between and be secured to the vertical walls. Portion 150 may be disposed between rails 122 and 124, or within the space defined between rails 122 and 124 with the upper rollers 146 rollingly engaging the top edges 132 of the rails and lower rollers rolling engaging the bottom edges 134 of the rails. Arm 154 may be in the form of a flat horizontal plate. Roller mount portion 150 may be rigidly secured to and extend downwardly from arm/plate 154 adjacent an inner end thereof. Dispenser mount portion 152 may be rigidly secured to and extend upwardly from arm/plate 154 adjacent an outer end thereof. Where carriage 114 is a right carriage, the inner and outer ends of arm 154 may respectively be left and right ends, whereas where carriage is a left carriage, the inner and outer ends may respectively be right and left ends. Rollers 146 may be rotatably mounted on portion 150 and may be positioned to the left and right of portion 150. Rollers 146 may have circular track-engaging or rail-engaging outer perimeters which rollingly engage one of the edges 132 and 134 of a given rail 122 and 124. The circular outer perimeters may be cylindrical so that they are flat as viewed from the rear (FIG. 10) or may have frusto-conical shape so that they are V-shaped as viewed from the rear. The outer perimeters may define a circular annular groove which may receive therein one of the rail edges, such as top edge 132 of inner/left rail 122.

Dispenser mount portion 152 may define mount holes 156 which may (as shown in FIG. 2) receive therein fasteners 158 (which may be pins or threaded fasteners such as bolts or screws) which may be used to rigidly secure dispenser assembly 4 to portion 152/carriage frame 144. More particularly, portion 152 may be received within space 85 with holes 156 aligned with holes formed in walls 81 and 83 so that fasteners 158 are likewise received in these aligned holes. Thus, dispenser assembly 4 may be mounted in a cantilever fashion on track assembly 112 via carriage 114. Especially during forward and rearward movement of assembly 4/carriage 114, sleeve 97 and hose 96, sleeve 97 may be used to protect hose 96 from wear which might otherwise occur without sleeve 97 due to the rubbing of hose 96 against the portions of sidewall 32 which define slot 106, whereby sleeve may prevent hose 96 from being worn through.

Dispenser assembly 4 is movable between the forward and rearward positions (and all other positions thereof) via carriage 114 moving forward and rearward along track 120. Rollers 146 may roll back and forth along track 120/rails 122, 124/edges 132, 134 from adjacent rear end 118/rear wall 128 to adjacent front end 116 front wall 126 and stop wall 136 as carriage 114 and dispenser assembly 4 move between the various positions thereof. Front bumper 148 may engage wall/stop 136 when assembly 4 is in the forward position, thereby serving to stop or limit further forward movement of assembly 4/carriage 114. Likewise, rear bumper 148 may engage wall/stop 128 when assembly 4 is in the rearward position, thereby serving to stop or limit further rearward movement of assembly 4/carriage 114. Carriage 114 may include a front latch or catch which engages front latch or catch 138 to releasably secure carriage 114 and dispenser 4 in the forward position. Likewise, carriage 114 may include a rear latch or catch which engages rear latch or catch 138 to releasably secure carriage 114 and dispenser 4 in the rearward position. A portion of drain hose 96 and a portion of sleeve 97 may move back and forth rearward and forward along with carriage 114/assembly 4 within slot 106.

The present paragraph describes relationships which may exist between various components when dispenser assembly 4 and carriage 114 are in the forward position. As viewed from above (FIG. 3), assembly 4/support 60/walls 81 and 83 and the left and right sides thereof may be parallel to left and right walls 38 and 40 and straight portions 123 of rails 122 and 124 and perpendicular to back wall 36. Faucets 62 may be lie along a vertical plane which is parallel to left and right walls 38 and 40 and straight portions 123 of rails 122 and 124 and perpendicular to back wall 36. Front end 68 may be adjacent and rearward of rear wheels 18. Rear end 70 may be adjacent and rearward of corner 41 (or corner 39) and the lower end thereof, the right side (or left side) of back wall 36 and the bottom thereof, the back end of right wall 40 (or left wall 38) and the bottom thereof, cutout 43, entrance opening 37, and rear end 110 of slot 106. Rear end 70 may be adjacent and forward (or rearward) of rear end 118 and back wall 128. A majority or all of dispenser assembly 4 may be higher than the top edges 132 of rails 122 and 124. Carriage 114 may be adjacent front end 116, walls 126 and 136 and the front ends of rails 122 and 124 with rollers 146 engaging straight portions 123 and may be distal and forward of rear end 118, rear wall 128 and curved portions 125 of rails 122 and 124. Front bumper 148 may engage wall 136. Cantilever arm 154 may extend within/through slot 106 so that a portion of arm 154 is inside space 35/sidewall 32 directly below floor 30, a portion of arm 154 is in slot 106, and a portion of arm 154 is outside space 35 and kiosk 1/sidewall 32. Roller mount portion 150 and rollers 146 may be entirely inside space 35/sidewall 32 directly below floor 30, and dispenser mount portion 152 may be entirely outside space 35/sidewall 32 so that portion 152 and dispenser assembly 4 are adjacent and spaced from sidewall 32 (and right or left walls 40, 38). A portion of drain hose 96 and protective sleeve 97 may be received in and pass through slot 106 so that each of hose 96 and sleeve 97 may have a portion in space 35, a portion in slot 106 and a portion outside of space 35/kiosk 1 sidewall 32. Sleeve 97 and the portion of hose 96 within slot 106 may be adjacent front end 108 of slot 106. Where assembly 4 is a right assembly and carriage 114 is a right carriage, the left surface/side of assembly 4 may be adjacent, spaced from and face the outer/right surface of right wall 40. Where assembly 4 is a left assembly and carriage 114 is a left carriage, the right surface/side of assembly 4 may be adjacent, spaced from and face the outer/left surface of left wall 38.

The present paragraph describes relationships which may exist between various components when dispenser assembly 4 and carriage 114 are in the rearward position. As viewed from above (FIG. 3), assembly 4/support 60/walls 81 and 83 and the left and right sides thereof may be at an angle to left and right walls 38 and 40, straight portions 123 of rails 122 and 124 and back wall 36; assembly 4/support 60/walls 81 and 83 and the left and right sides thereof may angle or extend rearward and outward from front end 68 to rear end 70 and rearward and outward away from the given wall/rear vertical corner (rearward and rightward from front end 68 to rear end 70 and rearward and rightward away from right wall 40/right rear vertical corner 41 if assembly 4 is a right assembly, and rearward and leftward from front end 68 to rear end 70 and rearward and leftward away from left wall 38/left rear vertical corner 39 if assembly 4 is a left assembly), and faucets 62 may be lie along a vertical plane which angles in a similar manner. Front end 68 may be distal and rearward of rear wheels 18. Front end 68 may be adjacent and rearward of corner 41 (or corner 39) and the lower end thereof, the right side (or left side) of back wall 36 and the bottom thereof, the back end of right wall 40 (or left wall 38) and the bottom thereof, cutout 43, entrance opening 37, and rear end 110 of slot 106. Rear end 70 may be distal and rearward of rear end 118 and back wall 128. Rear end 70 may be distal and rearward of corner 41 (or corner 39) and the lower end thereof, the right side (or left side) of back wall 36 and the bottom thereof, the back end of right wall 40 (or left wall 38) and the bottom thereof, cutout 43, entrance opening 37, and rear end 110 of slot 106. Rear end 70 may be distal and rearward of rear end 118 and back wall 128. A majority or all of dispenser assembly 4 may be higher than the top edges 132 of rails 122 and 124. Carriage 114 may be distal front end 116, the front ends of rails 122 and 124 and walls 126 and 136. Carriage 114 may be or extend adjacent and forward of rear end 118 and rear wall 128 and may be adjacent curved portions 125 of rails 122 and 124 with rollers 146 engaging curved portions 125. Rear bumper 148 may engage wall 128. Carriage 114 (including portions 150, 152 and 154 and rollers 146) may be entirely outside space 35 and rearward of rear end 37 such that no portion of carriage 114 is directly below floor 30. Arm 154 may be entirely outside slot 106 rearward of rear end 110 and rear end 37. Drain hose 96 and sleeve 97 may be entirely outside space 35 and slot 106 and rearward of back end 110 and back end 37 so that no portion of hose 96 or sleeve 97 is within slot 106 or space 35. Sleeve 97 and the portion of hose 96 within sleeve 97 may be distal front end 108 of slot 106.

The operation of kiosk 1 and the relationship of various components is now described with primary reference to FIGS. 2 and 5 although much of the movement and operational aspects will be understood from the previous description. When the kiosk is in the form of a mobile kiosk or vehicle 1, the driver of the vehicle will drive to a desired selling location for setting up to sell and dispense frozen confections and likely other food items as well. Once the vehicle is parked, dispenser assembly 4 may be immediately ready, without further action by the driver or another person, for operation/dispensing of liquid toppings from faucets 62 by a customer outside kiosk/vehicle 1. Alternately, a movable or entirely removable cover (not shown) may be used which covers all or a portion of assembly 4 during transit, that is, while vehicle 1 is being driven from a given location to the selling location. In a covered or closed position, such a cover may cover or block access to all of assembly 4 or, for instance, to faucets 62 or to faucets 62 and grate 92 and pan 94. Where such a cover is used, the driver or another person may uncover dispenser assembly 4 (move or remove the cover from assembly 4 or portions thereof, i.e., from the covered or closed position to an uncovered or open position) before assembly 4 is ready for use by customers. Furthermore, the driver or other vendor or person may apply force to dispenser assembly 4 with his or her hands to move assembly 4 rearward (Arrows A, B in FIG. 11) from the forward position (FIGS. 1, 2) to the rearward position (FIGS. 11, 12) before beginning to sell frozen confections and before customers begin using faucets 62. However, faucets 62 may be used when assembly 4 is in the forward position as well, so that the operator/vendor has the option of setting up with assembly 4 in any of its positions and still allow customers to use faucets 62 in any of those positions.

More particularly, the vendor/person may grip or manually contact dispenser assembly 4 and apply a rearward force thereto to move assembly 4 and carriage 114 rearward, thereby causing rollers 146 to roll rearwardly along the edges of rails 122 and 124. This rolling movement of assembly 4 and carriage 114 may initially be (as viewed from above) along a straight or linear path (Arrow A in FIG. 11) as carriage 114/rollers 146 move/roll along straight sections 123 and then along an arcuate or curved path (Arrow B in FIG. 11) as carriage 114/rollers 146 move/roll along curved sections 125. As carriage 114/rollers 146 move along this arcuate path, rear end 70 and front end 68 of assembly 4 may move in the axial direction. For instance, rear end 70 may move outwardly in the axial direction (to the right for a right dispenser assembly 4 or to the left for a left dispenser assembly 4) and front end 68 may move inwardly in the axial direction (to the left for a right dispenser assembly 4 or to the right for a left dispenser assembly 4). Dispenser assembly 4 may move essentially horizontally during the rolling movement and thereby remain at an essentially constant height throughout its travel (rearward or forward).

Roller mount portion 150 and rollers 146 in the forward position may extend within or be entirely inside sidewall 32 and within space 35, and as carriage 114 and assembly 4 move rearwardly, may move partially or entirely out of space 35 and through or within cutout 43 and outside/rearward of space 35/cutout 43/back wall 36 so that roller mount portion 150 and rollers 146 may be partially or entirely outside of sidewall 32 and space 35 in the rearward position. Similarly, a portion of cantilever arm 154 in the forward position may extend within or be entirely inside sidewall 32 and within space 35, and as carriage 114 and assembly 4 move rearwardly, may move partially or entirely out of space 35 and through or within cutout 43 and outside/rearward of space 35/cutout 43/back wall 36 so that this portion of arm 154 may be partially or entirely outside of sidewall 32 and space 35 in the rearward position. In addition, a portion (slot portion) of cantilever arm 154 in the forward position may extend within or be entirely within slot 106, and as carriage 114 and assembly 4 move rearwardly, may move partially or entirely out of slot 106 through back end 110 and outside/rearward of slot 106/space 35/cutout 43/back wall 36 so that this slot portion of arm 154 may be partially or entirely outside of slot 106 in the rearward position. When dispenser assembly 4 nears the back of track 120, rear bumper 148 may abut or engage stop 128 to limit or prevent further rearward movement of assembly 4 and carriage 114. A carriage latch or catch of carriage 144 may also releasably engage rear latch 138 to releasably secure carriage 144 and assembly 4 in the rearward position.

Figure 12:
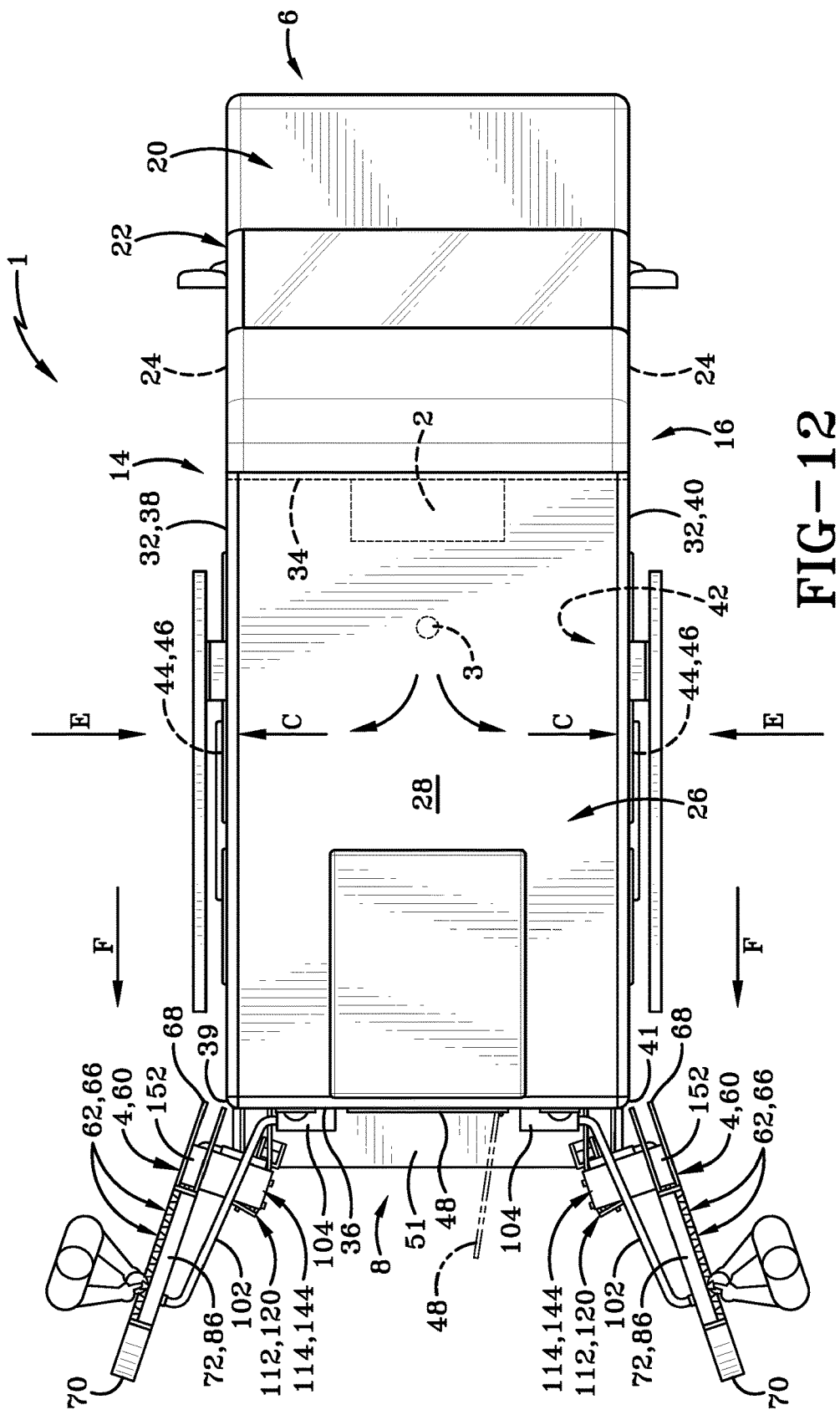
FIG. 12 is a top plan view showing the vehicle with two liquid topping dispenser assemblies mounted respectively near the rear left and right corners of the vehicle and illustrating various aspects of the use of the vehicle.

Referring to FIG. 12, once the vendor has parked the vehicle, the system is ready for producing, dispensing and selling frozen confections. More particularly, the vendor or operator inside interior chamber 42 may operate device 2 (FIG. 1) to produce frozen confection 3 within a cup, cone, dish or the like after having been ordered by a customer via serving window 44 when panel 46 is open. The vendor then receives money or another form of payment through the service window and hands or moves confection 3 with its container 5 through the service window (Arrow C) to the customer outside the vehicle. Arrows E and F show the general pedestrian or customer traffic flow during the process of selling the frozen confections and applying the liquid topping onto the confection. More particularly, Arrow E illustrates a line of customers and a customer approaching the service window to place the order and Arrow F illustrates the customer walking rearwardly toward dispenser assembly 4, where the customer uses one or more of faucets 62 to apply one or more liquid toppings to the confection. FIG. 5 more particularly illustrates a customer using one of faucets 62 by manually moving control 66 of the given faucet 62 with a finger to open faucet 62 such that the liquid topping flows from one of containers 56 through hose 58 and the corresponding spout 64 and downwardly onto confection 3. As noted earlier, a customer may operate faucets 62 in any of the positions of assembly 4, including the forward/stored position and rearward/dispensing position. When finished with sales at a given area, if dispenser assembly needs to be moved, the driver or other vendor or person may apply force to dispenser assembly 4 with his or her hands to move assembly 4 from the rearward/dispensing position (or other position) to the forward/stored/traveling position, and then drive the vehicle with assembly 4 in the traveling position.

More particularly, the vendor/person may grip or manually contact dispenser assembly 4 and apply a forward force thereto to move assembly 4 and carriage 114 forward, thereby causing rollers 146 to roll forward along the edges of rails 122 and 124. This rolling movement of assembly 4 and carriage 114 may initially be (as viewed from above) along an arcuate or curved path (opposite Arrow B in FIG. 11) as carriage 114/rollers 146 move/roll along curved sections 125 and then along a straight or linear path (opposite Arrow A in FIG. 11) as carriage 114/rollers 146 move/roll along straight sections 123. As carriage 114/rollers 146 move forward along the arcuate path, rear end 70 and front end 68 of assembly 4 may move in the axial direction. For instance, rear end 70 may move inwardly in the axial direction (to the left for a right dispenser assembly 4 or to the right for a left dispenser assembly 4) and front end 68 may move outwardly in the axial direction (to the right for a right dispenser assembly 4 or to the left for a left dispenser assembly 4). Carriage 114 and assembly 4 may move forward from the rearward position so that roller mount portion 150, rollers 146 and a portion of cantilever arm 154 which are partially or entirely outside/rearward of space 35 move through or within cutout 43 partially or entirely into space 35 to be forward of cutout 43/back wall 36 in the forward position. Carriage 114 and assembly 4 may also move forward from the rearward position so that a portion (slot portion) of cantilever arm 154 which may be partially or entirely outside/rearward of slot 106/back end 110 may move forward within or through back end 110 to extend within or be entirely within slot 106 in the forward position. When dispenser assembly 4 nears the front of track 120, front bumper 148 may abut or engage stop 138 to limit or prevent further forward movement of assembly 4 and carriage 114. A carriage latch or catch of carriage 144 may also releasably engage front latch 138 to releasably secure carriage 144 and assembly 4 in the forward position. The vendor may also place any cover used in a covering position which covers assembly 4 before driving the vehicle.

The use of the left and right dispenser assemblies not only increases the overall capacity for dispensing the liquid toppings due to the increased number of faucets 62, but also may increase the rate at which frozen confections 3 may be dispensed from within the kiosk especially in combination with an additional serving window 44 and corresponding panel 46. Thus, one or more workers inside the vehicle may simultaneously form and dispense frozen confections 3 for dispensing through the two service windows 44, thus creating two lines of customers represented by Arrows E, to increase the rate at which frozen confections 3 may be sold and dispensed through service windows 44 and also the rate at which customers may apply the toppings via the various faucets 62 of the left and right dispenser assemblies 4. As noted earlier, the kiosk may be stationary or mobile and may utilize one or more dispenser assemblies external to the kiosk to essentially increase the rate at which frozen confections may be sold and distributed. One or more of the dispensers may be mounted on or adjacent the kiosk, to include the option of a dispenser mounted on a trailer.

Figure 13:
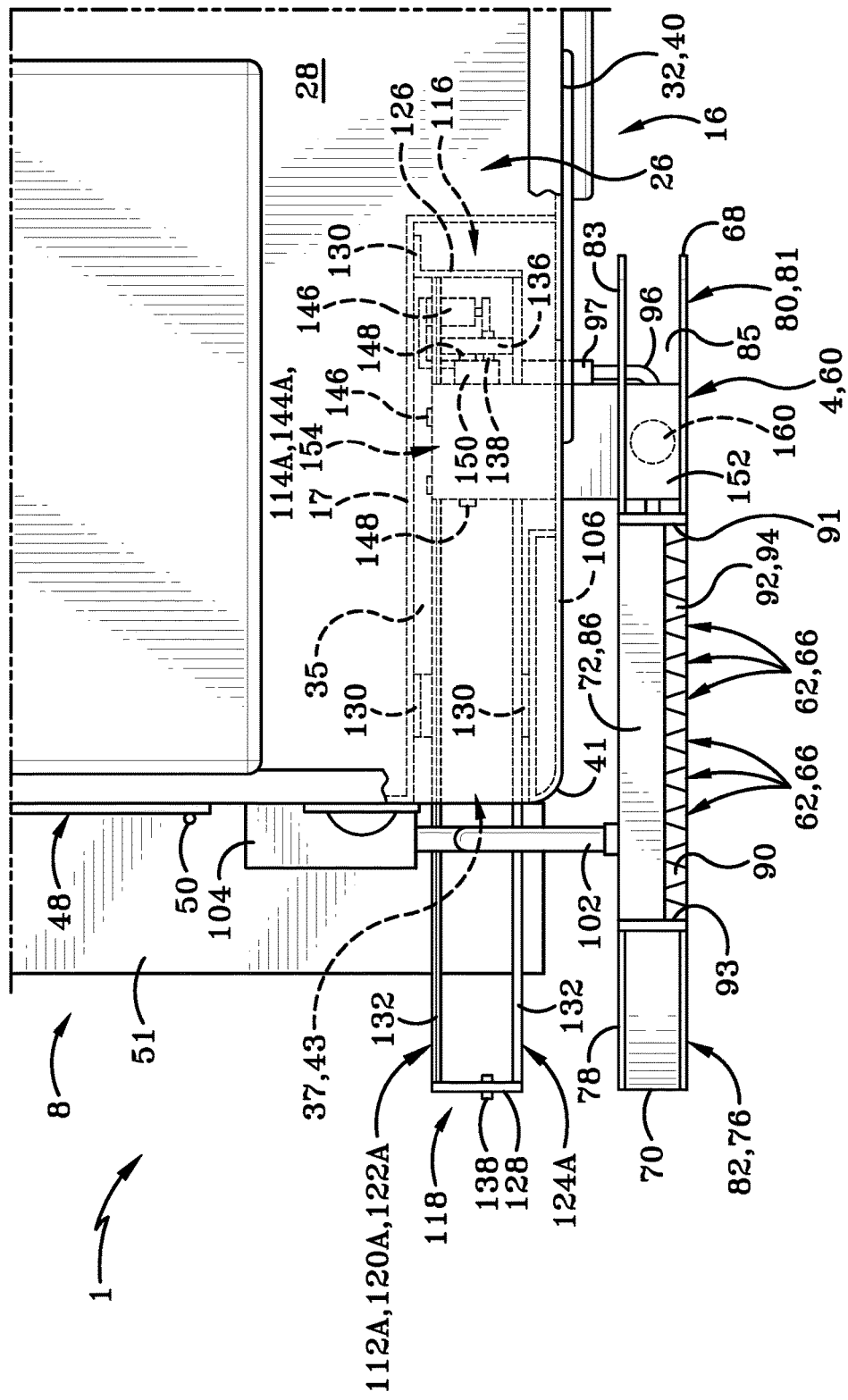
FIG. 13 is an enlarged top plan view of a right rear portion of the kiosk with the dispenser in a forward position and mounted on an alternate carriage and track system.
Figure 14:
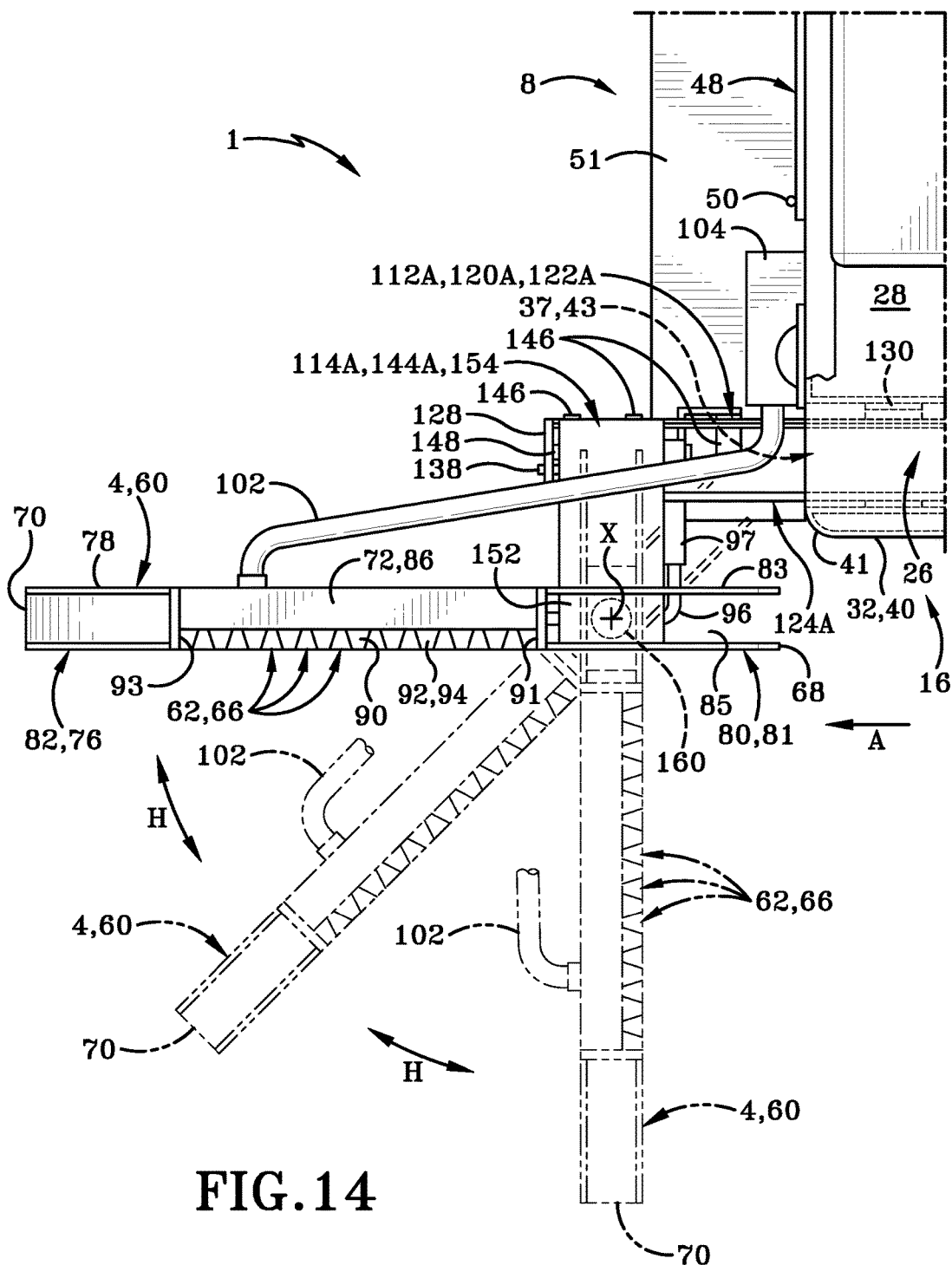
FIG. 14 is an enlarged top plan view of a right rear portion of the kiosk showing the dispenser assembly of FIG. 13 in several rearward dispensing positions.

FIGS. 13 and 14 show an alternate track and carriage system by which dispenser assembly 4 may be mounted on kiosk 1. This system is similar to that described above with the primary exceptions being that a track assembly 112A may be used which includes a straight track 120A having left and right rails 122A and 124A which may not include curved portions, and a pivot assembly 160 may be provided to allow dispenser assembly 4 to pivot when in the rearward position. A carriage assembly 114A may include pivot assembly 160. Various other aspects of the apparatus shown in FIGS. 13 and 14 is the same or essentially the same as that previously described, whereby the previous description will be understood to apply, and whereby much of the description will not be repeated for the sake of brevity.

Track assembly 112A may have front and back ends 116 and 118 between which track assembly 112A may be longitudinally elongated. Assembly 112A may include a longitudinally elongated straight track 120 extending from adjacent end 116 to adjacent end 118. Assembly 112A may include longitudinally elongated first and second straight rails 122A and 124A, which may be left and right rails and which may be straight from adjacent front end 116 to adjacent rear end 188, as viewed from above. Rails 122A and 124A may be straight and parallel to one another and to left and right walls 38 and 40 and straight as viewed from above (FIG. 11).

Assembly 112A may include front and rear walls 126 and 128 which may respectively be rigidly secured to the front ends and rear ends of rails 122A and 124A. Assembly 112A may include mounting flanges 130, which may be secured to rails 122A and 124A and/or front wall 126 and which may define mounting holes 131 which may be used as previously described to rigidly secure track assembly 112A to chassis/frame 17 and/or sidewall 32. Each of rails 122A and 124A may have top and bottom surfaces or edges 132 and 134, which may respectively be upward facing and downward facing surfaces or edges which may face in opposite directions from one another. Edges 132 and 134 may be essentially horizontal from adjacent the front end of the given rail to adjacent the back end of the given rail. Each edge 132 and 134 may be straight from adjacent the front end of the given rail to adjacent the rear end of the given rail, as viewed from above. Other aspects of track assembly 112A will be understood from the description of track assembly 112 further above.

Track assembly 112A may be secured to frame 17 with front portion 140 within space 35 and rear portion 142 outside space 35. Rear portion 142 may be rearward of and directly behind space 35. Thus, front wall 126, flanges 130, stop wall 136, front latch 138, and a majority or portion of track 120A/rails 122A and 124A may extend or be within space 35; and rear wall 128, rear latch 138 and rear portions of rails 122A and 124A may be outside of and rearward of/directly behind space 135.

Carriage assembly or carriage 114A may be similar to carriage 114 and thus may have a carriage frame 144A, a plurality of rollers 146 rotatably mounted on carriage frame 144A, and carriage bumpers 148. Carriage frame 144A may thus include roller mount portion 150, dispenser mount portion 152 and cantilever arm or portion 154. Frame 144A may also include pivot assembly 160. In one embodiment, pivot assembly 160 may be similar to the pivot assembly described in the parent application which is incorporated by reference as noted above. Assembly 160 may include a mount and a rotatable member which is rotatably mounted on the mount to rotate about a vertical axis X. The mount may be rigidly secured to arm 154 and the rotatable member may be rigidly secured to dispenser mount portion 152 so that portion 152 and dispenser assembly 4 are rotatable together with the rotatable member about axis X relative to the mount of assembly 160, arm 154, roller mount portion 150, track assembly 112A, sidewall 132 and other structures evident from the drawings. Dispenser mount portion 152 may thus be rotatably mounted on arm/plate 154 adjacent an outer end thereof, and dispenser assembly 4 may be mounted in a cantilever fashion on track assembly 112A via carriage 114A.

Dispenser assembly 4 is movable between the forward and rearward positions (and all other positions thereof) via carriage 114A moving forward and rearward along track 120 in the same manner as described with respect to carriage 114 other than movement along curved portions of rails. When carriage 114A and assembly 4 are in the rearward position, pivot assembly 160 may allow assembly 4 to rotate about axis X. Carriage 114A thus provides a somewhat different ability than carriage 114. When carriage 114 is not rolling along track 120 such that carriage 114 and its various portions 150, 152 and 154 are stationary or fixed relative to track 120, dispenser assembly 4 may be set or fixed in a given position. On the other hand, when carriage 114A is not rolling along track 120A such that roller mount portion 150 and arm 154 of carriage 114A are stationary or fixed relative to track 120A, dispenser assembly 4 (along with dispenser mount portion 152 and the rotatable member of pivot assembly 160) may rotate or pivot about axis X as shown by Arrows H in FIG. 14 between multiple positions. These multiple positions may include a rearmost or first pivoted position (solid lines in FIG. 14) in which assembly 4 may be essentially parallel to walls 38 and 40 and rails 122A and 124A and essentially perpendicular to back wall 36; a second pivoted position (one set of dashed lines) in which assembly 4 may be at a 45-degree angle (or other acute or obtuse angle) relative to walls 36, 38 and 40 and rails 122A and 124A; and a third pivoted position (another set of dashed lines) in which assembly 4 may be essentially perpendicular to walls 38 and 40 and rails 122A and 124A and essentially parallel to back wall 36.

The present paragraph describes relationships which may exist between various components when dispenser assembly 4 and carriage 114A are in the forward position. These relationships are the same or similar in many respects to those noted with respect to carriage 114, whereby much of this description will not be repeated here but understood to apply. As viewed from above (FIG. 3), assembly 4/support 60/walls 81 and 83 and the left and right sides thereof may be parallel to left and right walls 38 and 40 and rails 122A and 124A and perpendicular to back wall 36. Faucets 62 may be lie along a vertical plane which is parallel to left and right walls 38 and 40 and rails 122A and 124A and perpendicular to back wall 36. Pivot assembly 160 and axis X may be entirely outside space 35 and kiosk 1/sidewall 32 (adjacent and entirely to the right of right wall 40 or adjacent and entirely to the left of left wall 38) and may be entirely forward of back wall. Pivot assembly 160 may be secured in a fixed or non-pivoting state so that assembly 160 and dispenser assembly 4 is not rotatable about vertical axis X.

The present paragraph describes relationships which may exist between various components when dispenser assembly 4 and carriage 114A are in the rearward position, which may include the first, second and third pivoted positions note above. These relationships are the same or similar in many respects to those noted with respect to carriage 114, whereby much of this description will not be repeated here but understood to apply. This is especially true of the second pivoted position, which is most closely analogous to that of the rearward position of assembly 4 when mounted on carriage 114 and track assembly 112. However, various of the previously noted relationships may also be true of assembly 4 and carriage 114A when in first and third pivoted positions, as will be understood by one skilled in the art. Pivot assembly 160 and axis X may be entirely rearward of back wall 36 and entirely rightward of right wall 40 (or entirely leftward of left wall 38). As viewed from above, when assembly 4 is in the first pivoted position (solid lines in FIG. 14), assembly 4/support 60/walls 81 and 83 and the left and right sides thereof may be essentially parallel to left and right walls 38 and 40 and rails 122A and 124A and essentially perpendicular to back wall 36; faucets 62 may be lie along a vertical plane which is essentially parallel to left and right walls 38 and 40 and rails 122A and 124A and essentially perpendicular to back wall 36; rear end 70 may be directly behind front end 68; and rear segment 82 may be directly behind front segment 80. As viewed from above, when assembly 4 is in the second pivoted position (one set of dashed lines), assembly 4/support 60/walls 81 and 83 and the left and right sides thereof may be at a 45-degree angle (or other acute or obtuse angle) to left and right walls 38 and 40, rails 122A and 124A and back wall 36; faucets 62 may be lie along a vertical plane which angles in a similar manner; rear end 70 may be rearward of and to the right of (or left of) front end 68; and rear segment 82 may be rearward of and to the right of (or left of) front segment 80. As viewed from above, when assembly 4 is in the third pivoted position (the other set of dashed lines), assembly 4/support 60/walls 81 and 83 and the left and right sides thereof may be essentially perpendicular to left and right walls 38 and 40 and rails 122A and 124A and essentially parallel to back wall 36; faucets 62 may be lie along a vertical plane which is essentially perpendicular to left and right walls 38 and 40 and rails 122A and 124A and essentially parallel to back wall 36; rear end 70 may be directly to the right of (or left of) front end 68; and rear segment 82 may be directly to the right of (or left of) front segment 80.

The operation of kiosk 1 with dispenser assembly 4 mounted via carriage 114A is similar to that described above with respect to carriage 114 other than the differences in the way that assembly may move when mounted on carriage 114A. Such movement along straight track 120A/rails 122A and 124A and the pivotal movement of assembly 4 and so forth will be understood as described above. In addition to the vendor or other person applying a suitable force manually to dispenser assembly 4 to move assembly 4 and carriage 144A between the forward and rearward positions, the person may likewise apply a suitable force to assembly 4 to pivotally move assembly 4 back and forth between the multiple pivoted positions. As assembly 4 pivots about axis X from the rearmost or first pivoted position toward the second or third pivoted position or from the second pivoted position toward the third pivoted position, end 70 and segment 82 may move axially outward and forward while end 68 may move axially inward and rearward. FIG. 14 show this outward axial movement of end 70 and segment 82 as being rightward and the inward axial movement of end 68 as being leftward although for a left dispenser assembly, these may respectively be leftward and rightward. As assembly 4 pivots about axis X from the third pivoted position toward the first or second pivoted position or from the second pivoted position toward the first pivoted position, end 70 and segment 82 may move axially inward and rearward while end 68 may move axially outward and forward. FIG. 14 show this inward axial movement of end 70 and segment 82 as being leftward and the outward axial movement of end 68 as being rightward although for a left dispenser assembly, these may respectively be rightward and leftward. It is noted that pivot assembly 160 and axis X may be entirely outside sidewall 32/space 35 in all positions of dispenser assembly 4 including the forward and rearward positions.

Figure 15:
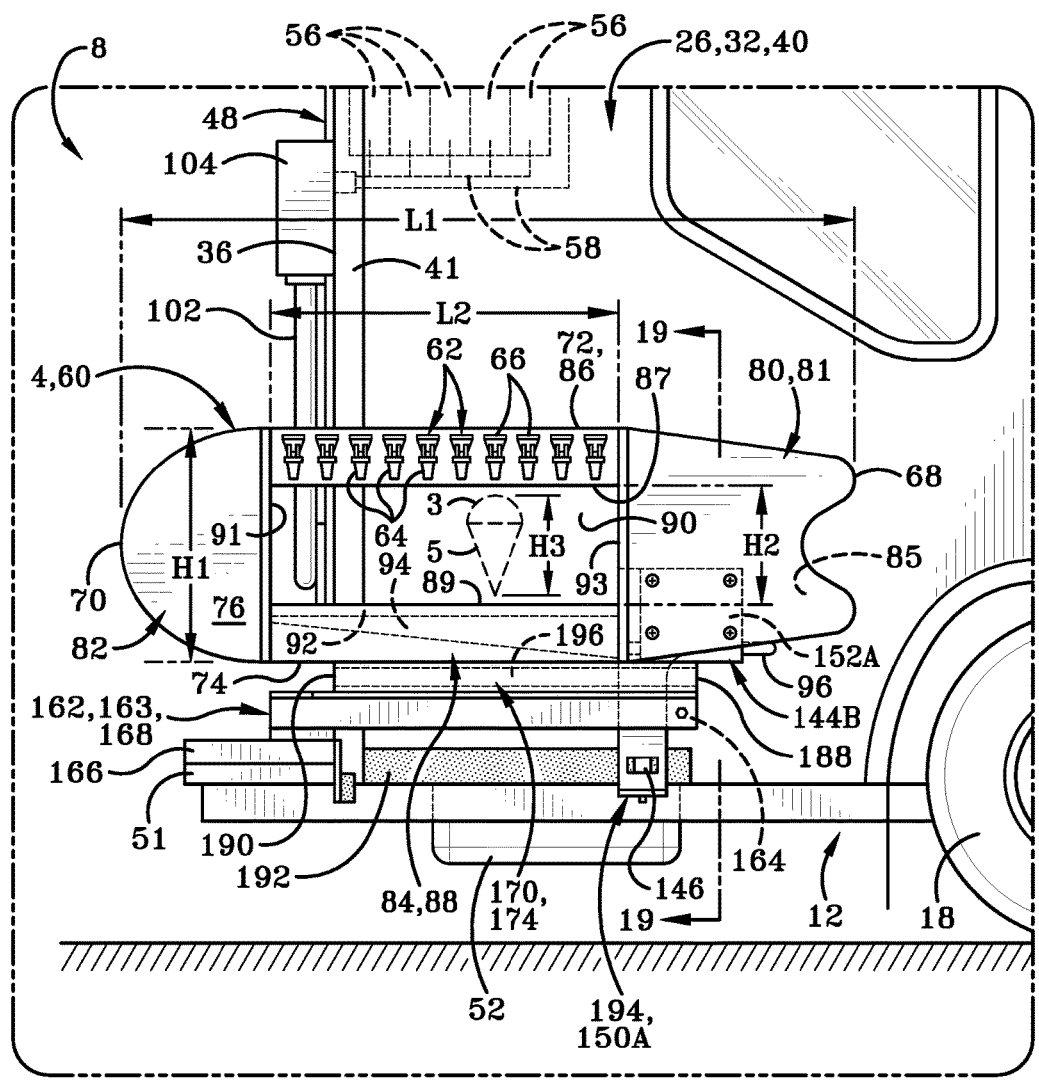
FIG. 15 is an enlarged right side elevation view of a rear portion of the kiosk with the dispenser assembly mounted via an alternate track and carriage system and shown in a forward position.
Figure 16:
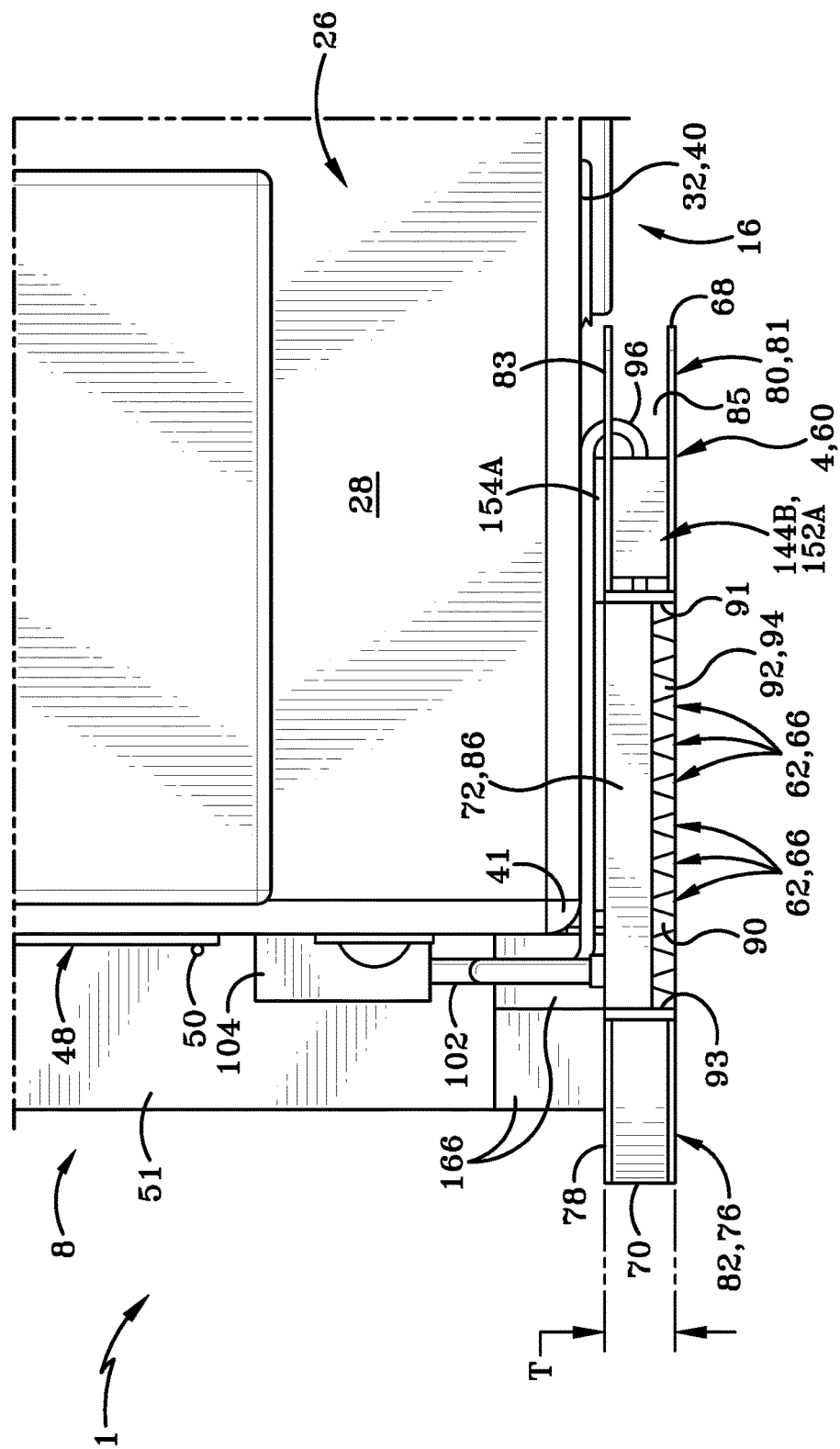
FIG. 16 is an enlarged top plan view of a right rear portion of the kiosk and dispenser assembly of FIG. 15.
Figure 17:
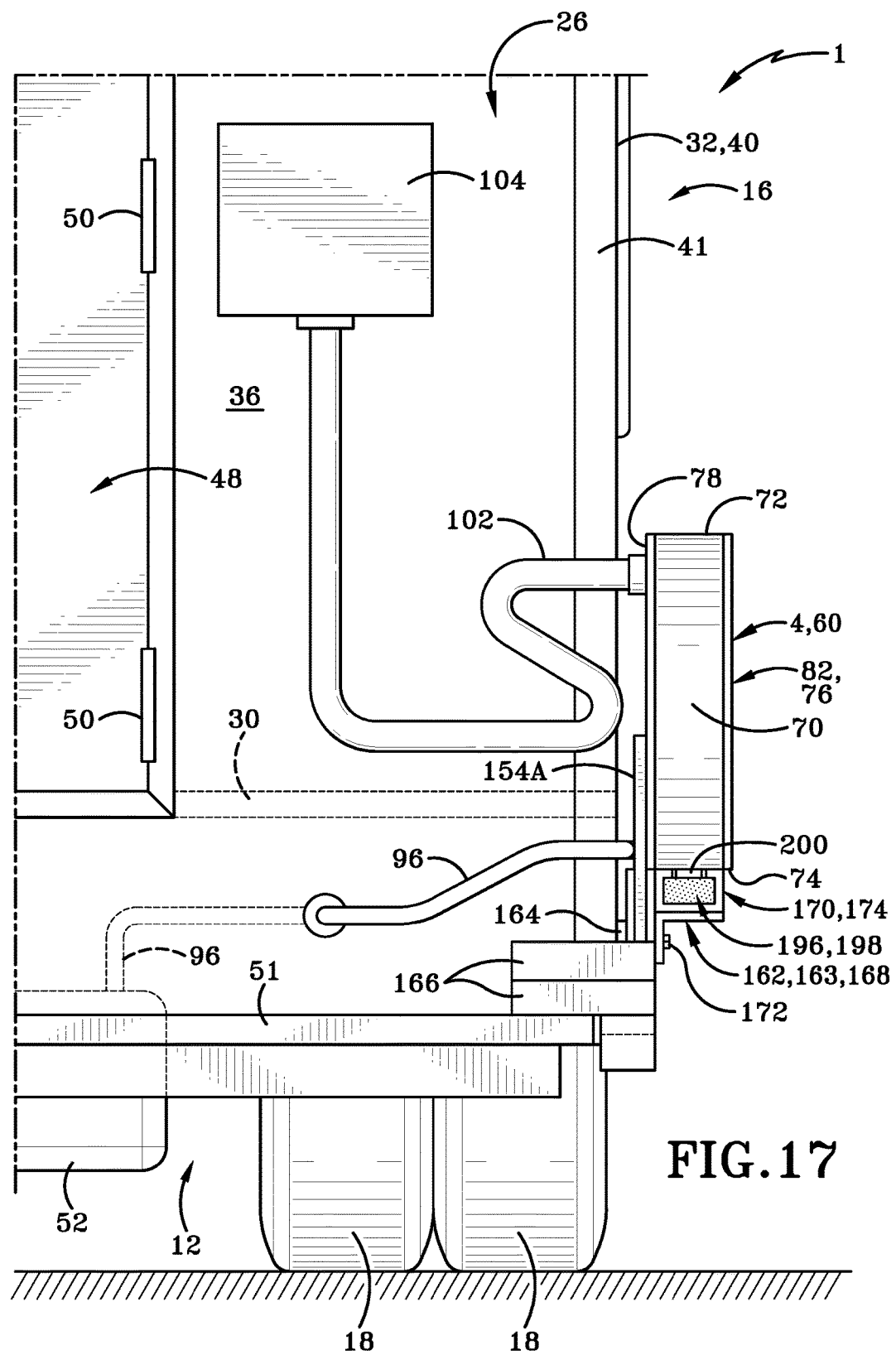
FIG. 17 is an enlarged rear elevation view of a right rear portion of the kiosk with the dispenser assembly of FIG. 15.
Figure 18:
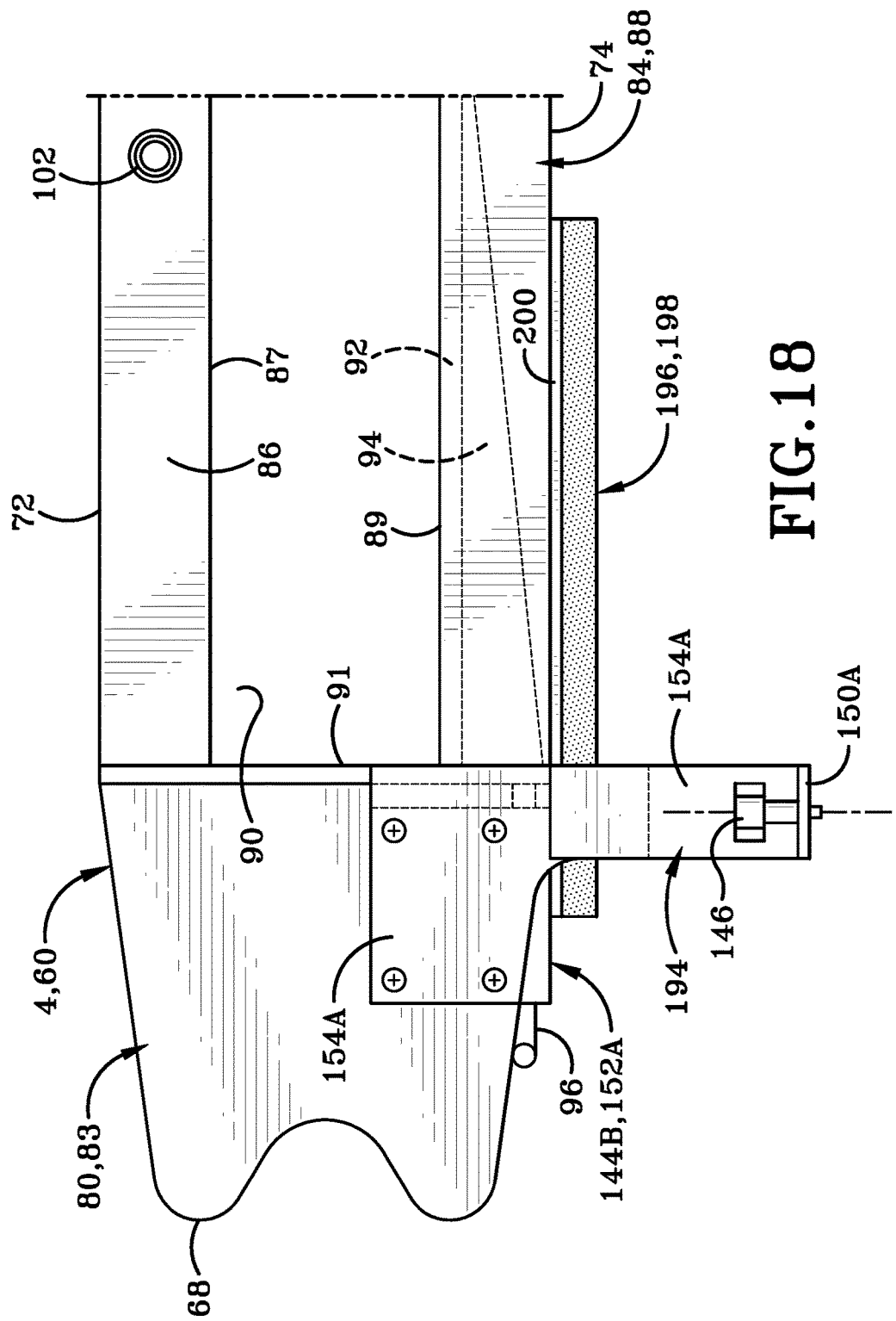
FIG. 18 is an enlarged left side elevation view of a front portion of the dispenser assembly, slider and stabilizer assembly of the carriage.
Figure 19:
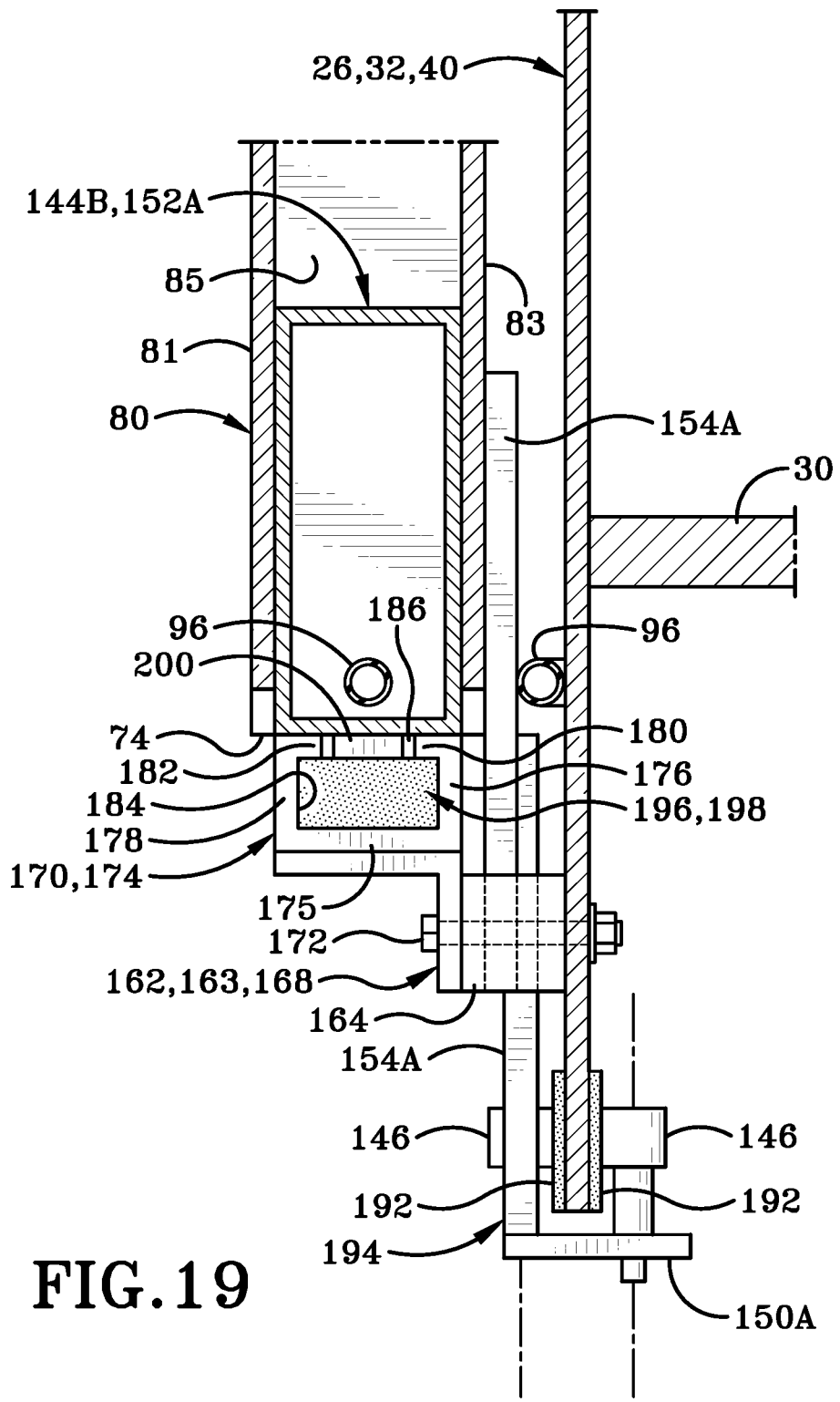
FIG. 19 is an enlarged sectional view taken on line 19-19 of FIG. 15.
Figure 20:
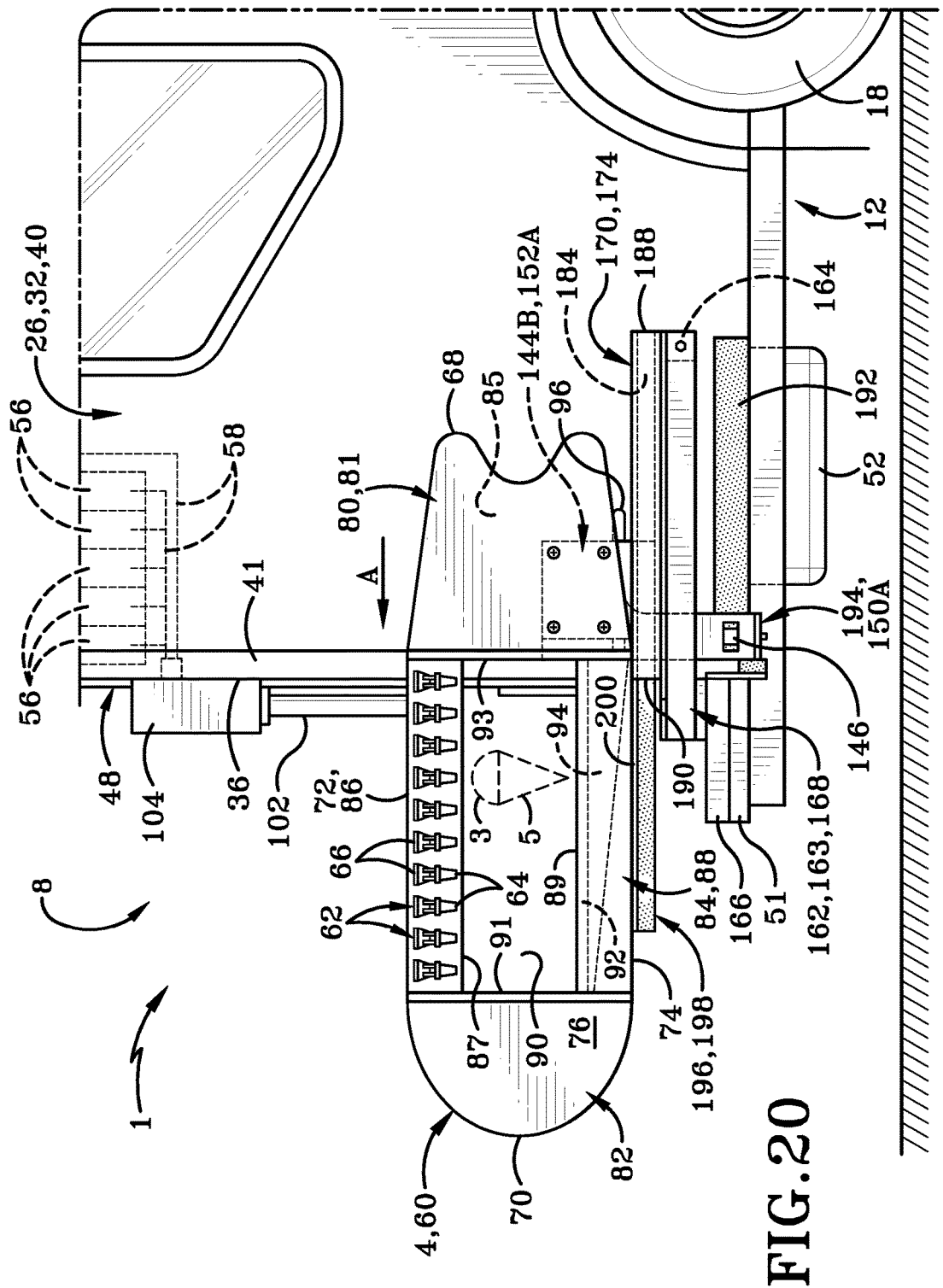
FIG. 20 is a view similar to FIG. 15 showing the dispenser assembly in a rearward position.

Another embodiment is shown in FIGS. 15-20 which includes a dispenser mounting assembly 162 which allows dispenser assembly 4 to move from a forward position shown in FIG. 15 to a rearward position shown in FIG. 20. The forward position shown in FIG. 15 is analogous to the forward positions of the previous two embodiments whereby the relationship between dispenser assembly 4 and various other components may be the same or essentially the same as previously described although there will be other distinctions pointed out further below. Similarly, the rearward position shown in FIG. 20 is analogous to the rearward position of the second embodiment in which dispenser assembly 4 is mounted on carriage 114A and dispenser assembly 4 is in the first pivoted position, whereby many of the various relationships between dispenser assembly 4 and this rearward position of FIG. 20 are the same or essentially the same as those previously described with respect to the rearward first pivoted position. Mounting assembly 162 may include a track assembly 163 having a front mount 164, a back mount 166, a longitudinal bar 168 and a track 170. Assembly 162 and assembly 163 may be rigidly secured to kiosk 1 via the front and back mounts 164 and 166. More particularly, front mount 164 may be rigidly secured to chassis 17 and/or sidewall 132 (such as right wall 40 or left wall 38) such as by one or more fasteners 172 (FIG. 19) which may be in the form of the fasteners previously described herein. Fastener 172 may extend through holes formed in longitudinally elongated bar 168, front mount 164 and side wall 132. Front mount 164 may serve as a spacer which spaces bar 168 and track 170 outwardly from sidewall 132. Rear mount 166 may be rigidly secured to sidewall 132 (such as back wall 36) and/or chassis 17 and/or bumper 51. Bar 168 may be secured adjacent its front end to front mount 164 and adjacent its back end to rear mount 166. Track 170 may be rigidly secured to the top of bar 168. Track 170 may be longitudinally elongated between a front and rear end thereof. As viewed from above, bar 168 and track 170 may be essentially parallel to left and right walls 38 and 40 and dispenser assembly 4, and essentially perpendicular to back wall 36.

Track 170 may be in the form of a channel 174 having a base 175, left and right rails 176 and 178 rigidly secured to and extending upwardly from base 175 and spaced apart from one another, a left overhang 180 rigidly secured to and extending to the right from the top of left rail 176 and a right overhang 182 rigidly secured to and extending to the left from the top of right rail 178. Channel 174 may define a longitudinally elongated space, cavity or passage 184 extending from the front end to the rear end of channel 174. Passage 184 may be said to be defined by base 175, rails 176 and 178, and overhangs 180 and 182. Overhangs 180 and 182 extend toward each other to respective terminal ends which define therebetween a top entrance opening 186 of cavity or passage 184. Passage 184 and opening 186 may have a front and back end 188 and 190 which may likewise represent the front and rear ends of channel 170.

It is noted that sidewall 132 may be formed without the opening or cutout 43 and also without slot 106 whereby subfloor portion 33 of sidewall 32 may be generally solid. Thus, for instance, right rear corner 41 may extend all the way to the bottom of right wall 40 and back wall 36, and left rear corner 39 may likewise extend all the way to the bottom of left wall 38 and back wall 36. Wear strips 192 may be provided which are rigidly secured to sidewall 32 and made of a material harder than the material of which sidewall 32 is formed. More particularly, inner and outer wear strips 192 (which may be left and right wear strips) may be rigidly secured respectively to the inner and outer surfaces of right wall 40 (or left wall 38) adjacent the bottom of the given wall 40 or 38. Each wear strip 192 may be longitudinally elongated and may be secured to subfloor section 33 rearward of the rear set of wheels 18. Wear strips 192 may have rear ends which are adjacent either right rear corner 41 or left rear corner 39.

Dispenser mounting assembly 162 may further include a carriage assembly 194 comprising a telescoping arm or slider 196 having a head 198 and a neck 200. Slider 196, including head 198 and neck 200, may be longitudinally elongated between a front and rear end thereof. Head 198 of slider 196 may be slidably received within passage 184 whereby slider 196 and dispenser assembly 4 are slidable back and forth between the forward and rearward positions. Head 198 may be formed of a material which has a relatively low coefficient of friction such that it will easily slide back and forth within passage 184. This relatively low coefficient of friction may allow for easy sliding of head 198 within passage 184 during the frictional sliding engagement between head 198 and the inner surfaces of channel 174 in contact with the outer surfaces of head 198. Overhangs 180 and 182 may extend over or hang over portions of head 198 to prevent head 198 from moving upwardly out of passage 184. Neck 200 may be narrower than head 198 as viewed from the front or back or in section (FIGS. 17, 19) so that neck 200 may be received within entrance opening 186. Neck 200 may be rigidly secured to and extend upwardly from head 198 and serve to help mount dispenser assembly 4 on slider 196.

Carriage assembly 194 may include a carriage frame 144B having a roller mount portion 150A, a dispenser mount assembly 152A and a cantilever arm or portion 154A. Roller mount portion 150A may have rotatably mounted thereon a plurality of rollers 146 which may be inner and outer rollers or left and right rollers which may be rotatable about respective vertical and essentially parallel axes. Rollers 146 may have circular or cylindrical outer surfaces which rollingly engage wear strips 192. Rollers 146 may include one or more inner rollers 146 which are inside sidewall 132 and one or more outer rollers which are outside sidewall 132. The inner and outer rollers 146 may be inside and outside of or on opposite sides of subfloor portion 33 of right wall 40 (or left wall 38) with a portion of the given wall and wear strips directly therebetween. Dispenser mount portion 152A may be essentially the same as portion 152 of carriage frame 144 described above. Portion 152A may be received within space 85 and secured to walls 81 and 83 of dispenser assembly 4 in the same manner as described in the earlier embodiments. Arm 154A adjacent an upper end thereof may be rigidly secured to dispenser mount portion 152A and extend downwardly therefrom to a lower end which may be rigidly secured to roller mount portion 150A. Arm 154A may extend downwardly within the space defined between sidewall 132 (for instance, right wall 40 or left wall 38) and bar 168 and/or track 170. Thus, roller mount portion 150A and rollers 146 may be mounted in a cantilever fashion via cantilever arm 154A. Mounting portion 152A may be rigidly secured to neck 200 and to dispenser assembly 4, thereby mounting or helping to mount dispenser assembly 4 on slider 196. In addition, other portions of assembly 4 may be rigidly secured to neck 200. For instance, the bottom surface of dispenser assembly 4 and/or lower arm 88 may be rigidly secured to neck 200 to mount or help mount assembly 4 on slider 196.

In operation, the vendor may undergo the general process discussed previously and may move dispenser assembly 4 between the forward and rearward positions by the same type of physical or manual rearward force applied to assembly 4 to move assembly 4 rearward or forward force to move assembly 4 forward. During the forward or rearward movement of assembly 4, slider 196 may slide within and slidingly engage track 170/channel 174 and rollers 146 may rollingly engage the inner surface of the inner wear strip 192 and the outer surface of the outer wear strip 192, wherein these inner and outer surfaces may face in opposite directions.

Figure 21:
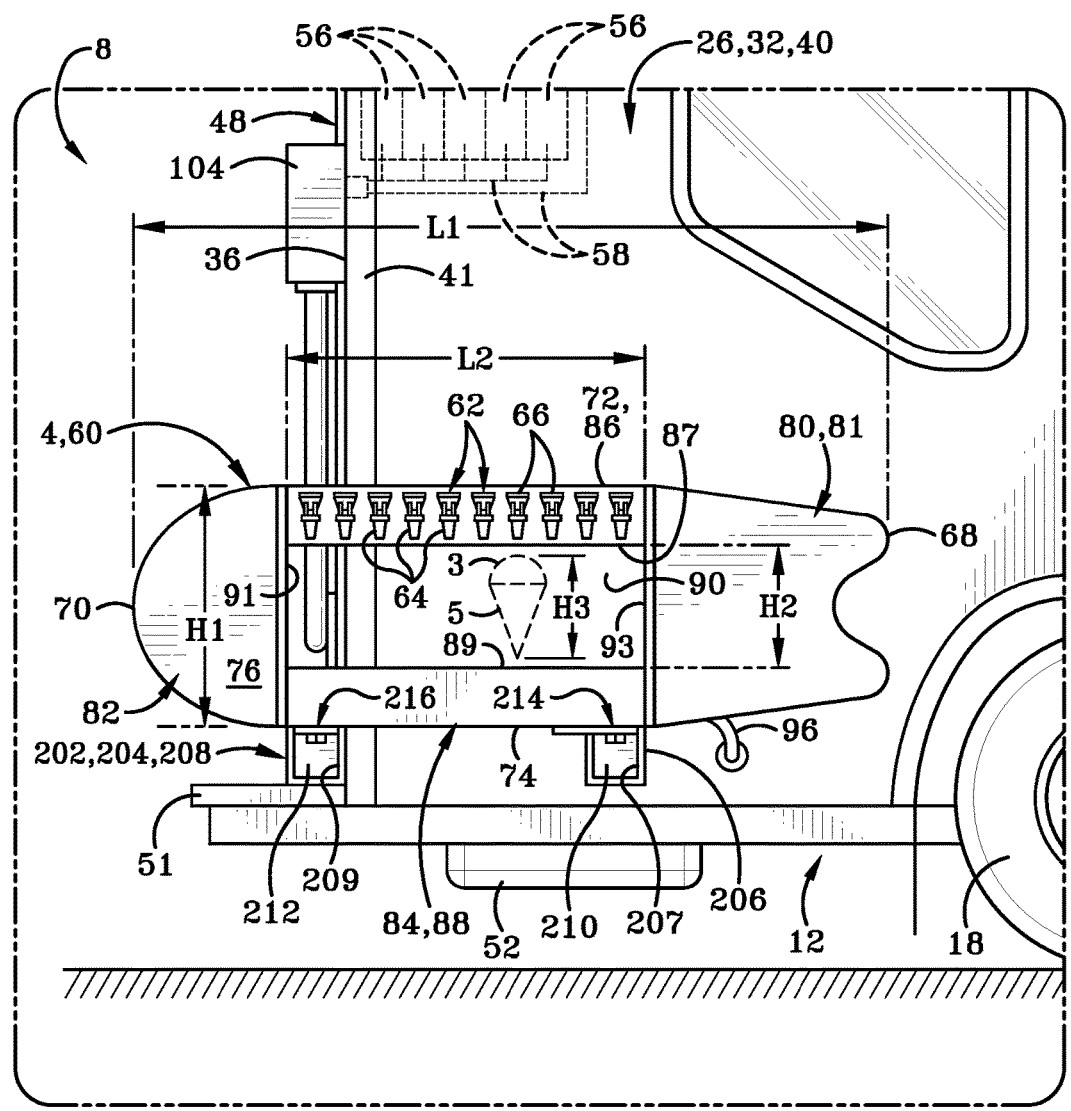
FIG. 21 is an enlarged right side elevational view of a right rear portion of the kiosk with the dispenser assembly mounted on sliders or telescoping arms in a forward position.
Figure 22:
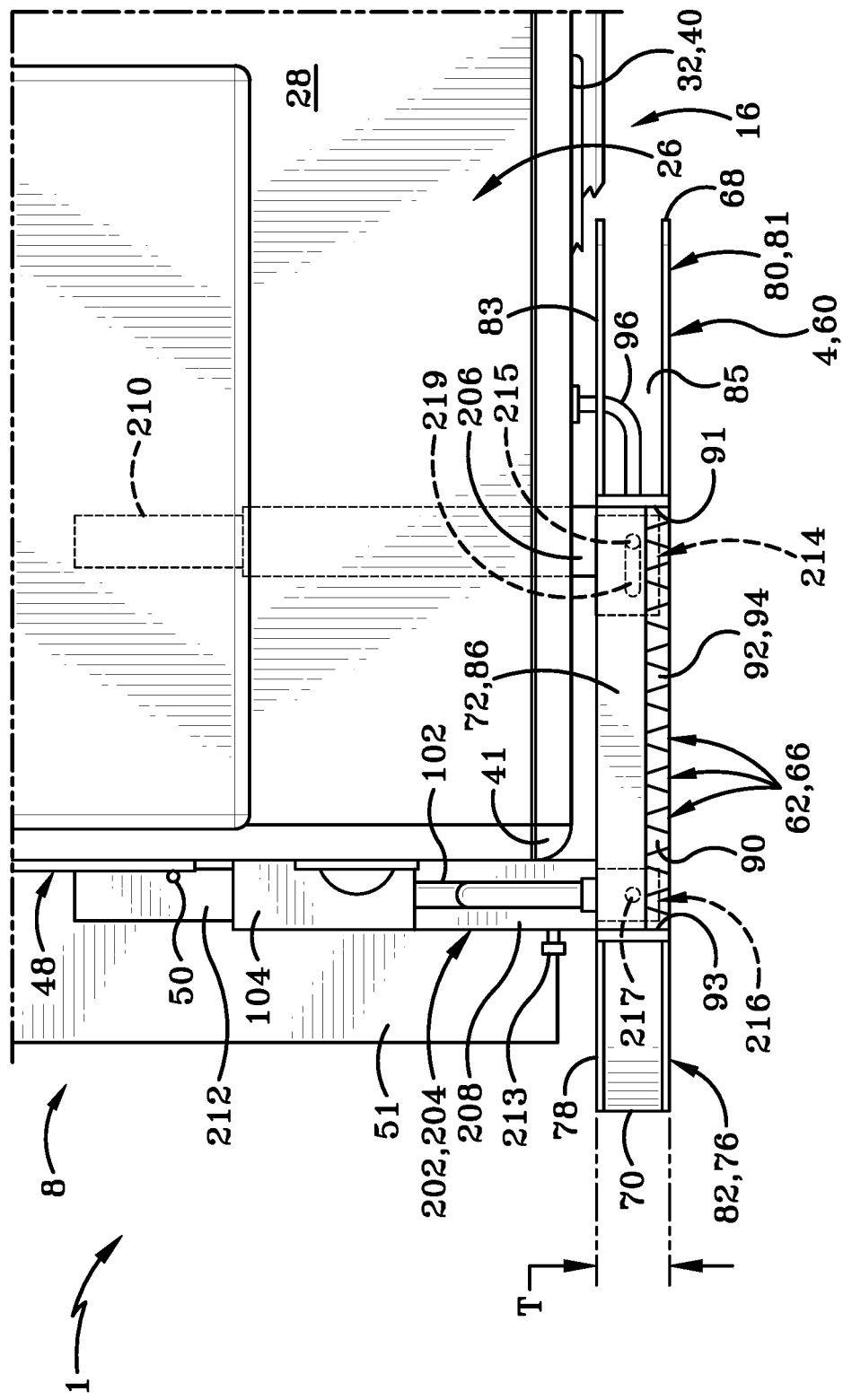
FIG. 22 is an enlarged top plan view of a right rear portion of the kiosk of the dispenser assembly shown in FIG. 21.
Figure 23:
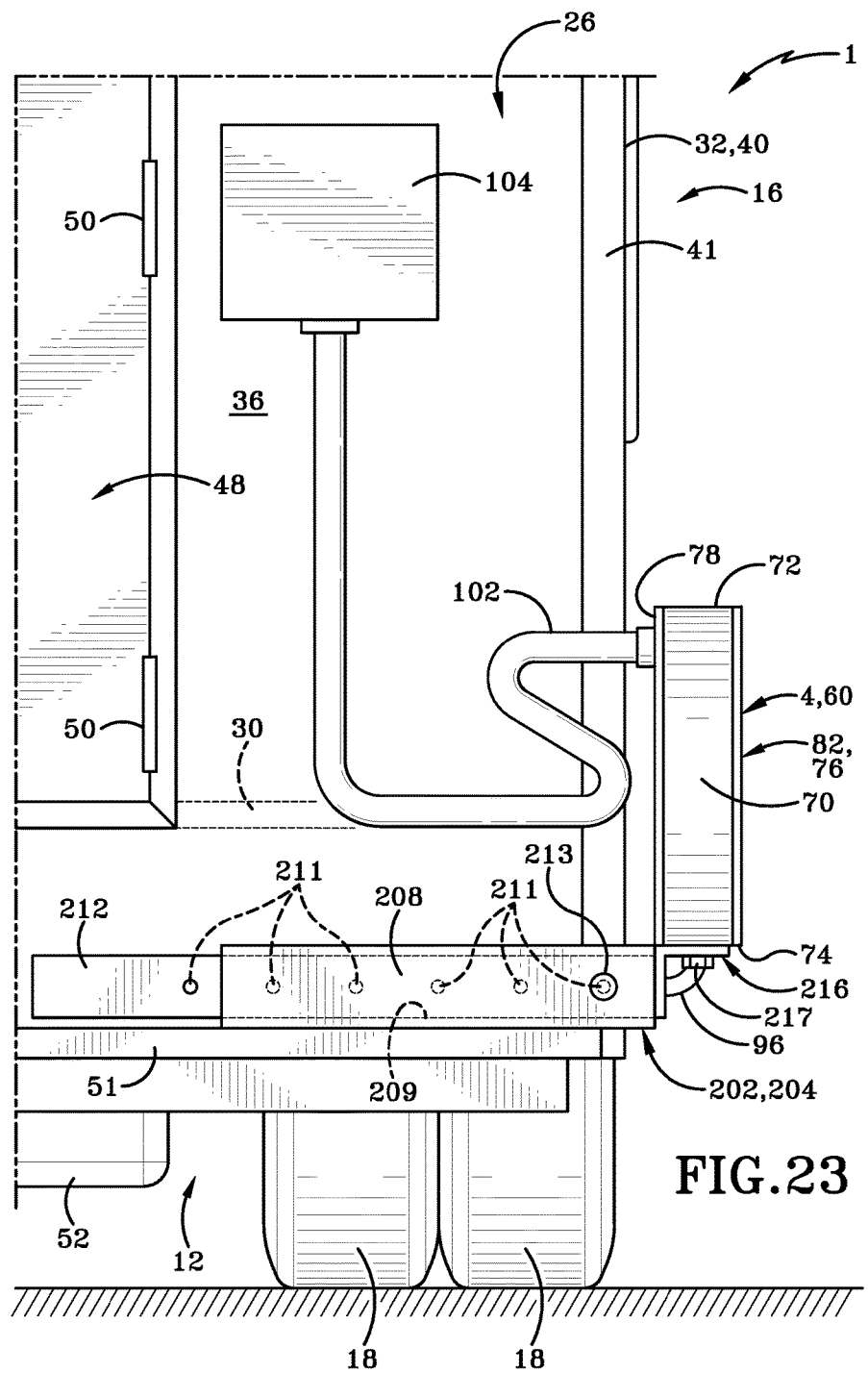
FIG. 23 is an enlarged rear elevation view of a right rear portion of the kiosk and dispenser assembly of FIG. 21.

Another embodiment is shown in FIGS. 21-24 which may include a dispenser mounting assembly 202 comprising a track assembly 204 which may have a front track 206 and a rear track 208. Front track 206 may define a front passage 207, and rear track 208 may define a rear passage 209. Track assembly 204 may further include a front slider or telescoping arm 210 which is slidably received within front passage 207. Likewise, assembly 204 may include a rear slider or telescoping arm 212 which is slidably received within rear passage 209. As illustrated in FIG. 23, each of the tracks 206 and 208 and sliders 210 and 212 may define a plurality of axially spaced holes 211 which may receive a pin 213 as discussed further below. Pin 213 may be movably mounted on a given track 206 or 208. Assembly 204 may include a front pivot assembly 214 having a front pivot or axis 215, and a rear pivot assembly 216 having a rear pivot or axis 217. Axes 215 and 217 may be essentially vertical and parallel to one another.

As discussed with the previous embodiment, sidewall 32 may be formed without slot 106 or cutout 43. Front track 206 and front arm 210 may extend through a hole formed in sidewall 32, such as through right wall 40 or left wall 38, and may include portions within subfloor space 35. Drain hose 96 may likewise extend through a hole formed in said walls. Mounting assembly 202 is configured to allow dispenser assembly 4 to move between multiple positions, such as a first or inward position shown in FIGS. 21-23 and a second or outward position shown in FIG. 24, which may be to the right of the first position when dispenser assembly 4 is a right assembly or to the left of the first position when dispenser assembly 4 is a left assembly.

As viewed from above, each of tracks 206 and 208, passages 207 and 209 and arms 210 and 212 may be axially elongated, parallel to one another and back wall 36 and perpendicular to left and right walls 38 and 40. Front track 206 may be rigidly secured to sidewall 32 (e.g., left or right walls 38 and 40) and/or chassis 17. Rear track 208 may likewise be rigidly secured to sidewall 132 (e.g., back wall 36) and/or chassis 17 and/or bumper 51. Thus, tracks 206 and 208 may be rigidly mounted on kiosk 1. One of pivot assemblies 214 and 216 may have an elongated slot 219 formed therein. Slot 219 is shown formed in the front pivot assembly 214 although it could be formed in the rear pivot assembly 216 as well. Pin 215 is shown received within slot 219 such that pin 215 may slide back and forth within slot 219 from adjacent one end thereof to adjacent an opposite end thereof.

This paragraph describes the relationship between various components when dispenser assembly 4 is in the inward or retracted position shown in FIGS. 21-23. This inward position is analogous to the forward position of the previous three embodiments, whereby many of the same relationships exist and are not described further here. The outer end (here right end) of front arm 210, front pivot assembly 214 including pin/axis 215 and the portion of dispenser assembly 4 connected to pivot assembly 214 may be adjacent the outer end (here right end) of front track 206. Similarly, the outer end (here right end) of rear arm 212, rear pivot assembly 216 including pivot/axis 217 and the portion of assembly 4 connected to pivot assembly 216 may be adjacent the outer end (here right end) of rear track 208.

Figure 24:
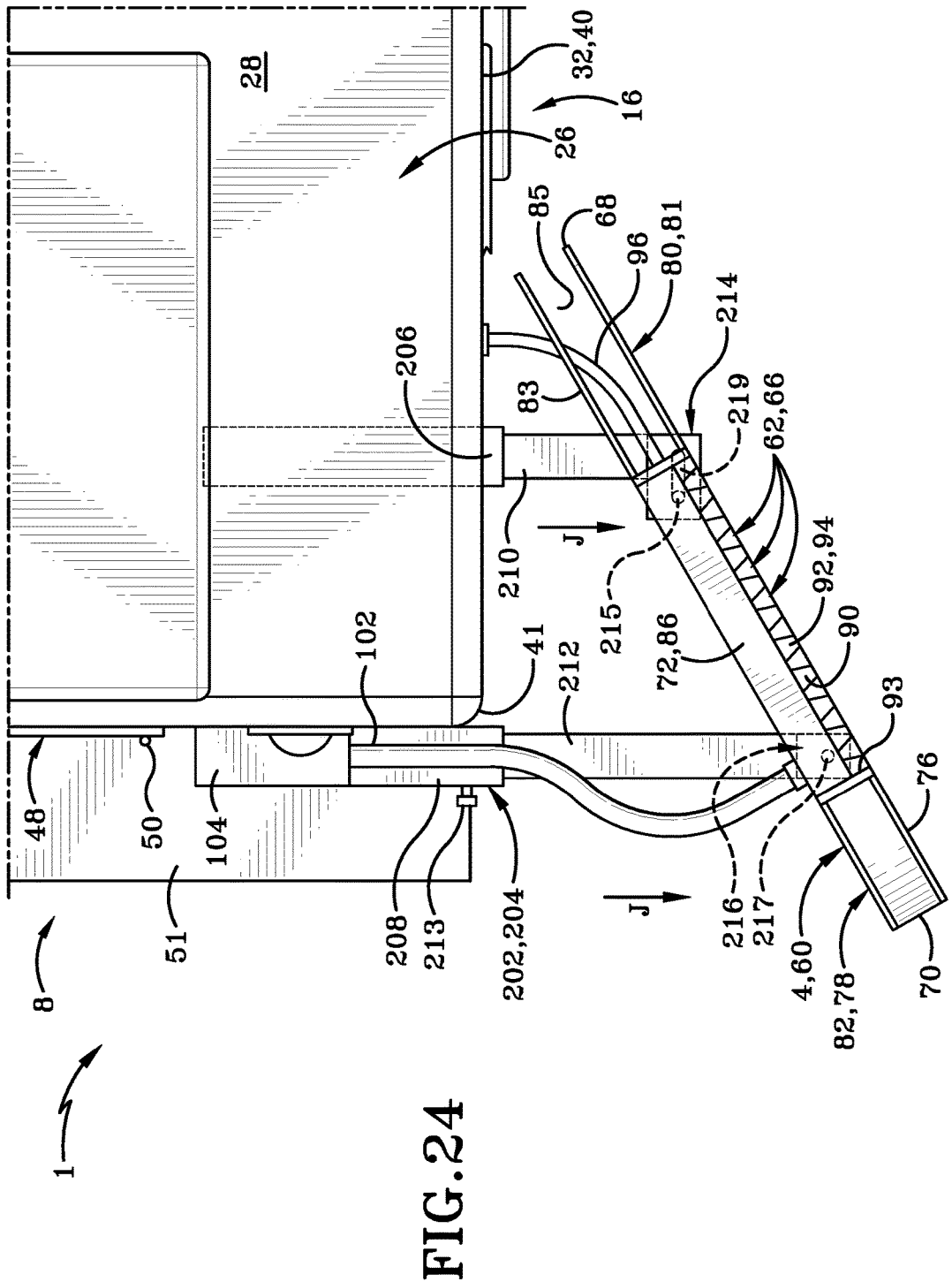
FIG. 24 is a top plan view similar to FIG. 22 showing the dispenser assembly in a deployed or dispensing position.

The present paragraph describes relationships which may exist between various components when dispenser assembly 4 and track assembly 204 are in the outward or extended position shown in FIG. 24. As viewed from above, assembly 4/support 60/walls 81 and 83 and left and right sides thereof may be at an angle to left and right walls 38 and 40 and back wall 36, and may angle or extend rearward and outward from front end 68 to rear end 70, and faucets 62 may lie along a vertical plane which angles in a similar manner. Front end 68 may be adjacent and rearward of rear wheels 18. Front end 68 may be distal and forward of corner 41 (or corner 39) and the lower end thereof, the right side (or left side) of back wall 36 and the bottom thereof and the back end of right wall 40 (or left wall 38) and the bottom thereof. Rear end 70 may be distal, rearward and outward of corner 41 (or corner 39) and the lower end thereof.

Although dispenser assembly 4 is shown in the outward position of FIG. 24 as being angled rearward and outward as described above, assembly 4 may also be moved to an outward position in which dispenser assembly 4 is essentially parallel to left and right walls 38 and 40 and essentially perpendicular to back wall 36, or at an angle generally opposite to that shown such that assembly 4 angles rearward and inward with front end 68 further outward than rear end 70 from the given wall 40 or 38. Moreover, tracks analogous to tracks 206 and 208 and arms analogous to arms 210 and 212 may be oriented differently, for instance longitudinally elongated to be parallel to walls 38 and 40, or at an angle to walls 38 and 40 and back wall 36.

The operation of kiosk with dispenser assembly 4 mounted via dispenser mounting assembly 202 is similar to that described above with respect to the previous embodiments other than the differences in the way that assembly 4 and related components may move when mounted on assembly 202. As with the previous embodiments, faucets 62 may be used in any position of dispenser assembly 4. Usually, the vendor will drive vehicle 1 with dispenser assembly 4 in the inward position of FIGS. 21-23 and arrive at a vending location with assembly 4 in this position. The driver, vendor or other person may apply force to dispenser assembly 4 with his or her hands to move assembly 4 (Arrows J in FIG. 24) from the inward to the outward position. During this movement, arms 210 and 212 may move or slide axially outward within passages 207 and 209 of tracks 206 and 208 so that the outer ends of arms 210 and 212 and pivot assemblies 214 and 216 move outwardly away from the kiosk, which may be in the axial direction parallel to back wall 36 and perpendicular to walls 38 and 40. Arms 210 and 212 may respectively slidably engage tracks 206 and 208 during movement of assembly 4 and arms 206 and 208 axially outwardly or inwardly. As illustrated in FIG. 24, rear arm 212 is extended further than arm 210 so that the outer end of arm 212 and pivot assembly 216 moves further outward than does the outer end of arm 210 and pivot assembly 214. When arms 210 and 212 are moved or extended outwardly a different distance from one another, dispenser assembly 4 will pivot about axes 215 and 217 relative to arms 210 and 212. During this pivotal movement, pivot or pivot pin 215 may slide within slot 219 from adjacent one end thereof to adjacent another end thereof. As noted above, dispenser assembly 4 may be moved to an outward position which may not be angled as shown in FIG. 24. Thus, the extension or movement of assembly 4 and arms 210 and 212 in the outward axial direction of Arrows J may not involve the pivotal movement of dispenser assembly 4 about axes 215 and 217, that is where the outer ends of arms 210 and 212 move out the same distance and at the same rate during their extension. Alternately, if front arm 210 is moved outwardly further than rear arm 212, assembly 4 may pivot about axes 215 and 217 in the opposite direction than that which occurs where rear arm 212 is moved outward further than arm 210.

When the vendor is ready to move on from the given vending location, he or she or another person may apply force to dispenser assembly 4 with his or her hands to move assembly 4 inward (opposite Arrows J), which may include pivotal movement of assembly 4 about axes 215 and 217 in order to bring dispenser assembly 4 into the inward position. Where a releasable securing mechanism is used to releasably secure assembly 4 and arms 210 and 212 in the inward and/or outward positions, that mechanism may be released prior to the movement of dispenser assembly between the inward and outward positions. For instance, pin 213 may be inserted within aligned holes 211 in track 208 and arm 212 to secure assembly 4 in various positions including the inward and outward positions. Pin 213 may thus be removed from at least one of the aligned holes 211 to allow for the sliding movement of arm 212 inward or outward within the passage of track 208. A similar securing mechanism may be provided for track 206 and arm 210.

It is contemplated that tracks 206 and 208 and arms 210 and 212 may be modified so that instead of being straight, each may be curved as view from above (similar to curved portions 125 of track 120 and possibly over a greater arc). The curved arms could thus slide into and out of the curved tracks respectively, thereby allowing dispenser assembly 4 to move along an arcuate path as the curved arms moved in or out.

It is also contemplated that dispenser mounting assembly 202 may be modified to include an additional track such as track 120A or track 170, which may extend between the outer ends of arms 210 and 212 and be rigidly or pivotally mounted on arms 210 and 212. If a track similar to track 120A is thus mounted on arms 210 and 212, dispenser assembly 4 may be mounted on said track by a carriage similar to carriage 114 or 114A. If a track similar to track 170 is thus mounted on arms 210 and 212, dispenser assembly 4 may be mounted on said track via a carriage similar to carriage 194. In either case, dispenser assembly 4 would be able to additionally move back and forth along the given additional track perpendicular to or at an acute or obtuse angle to arms 210 and 212 and tracks 206 and 208.

Figure 25:
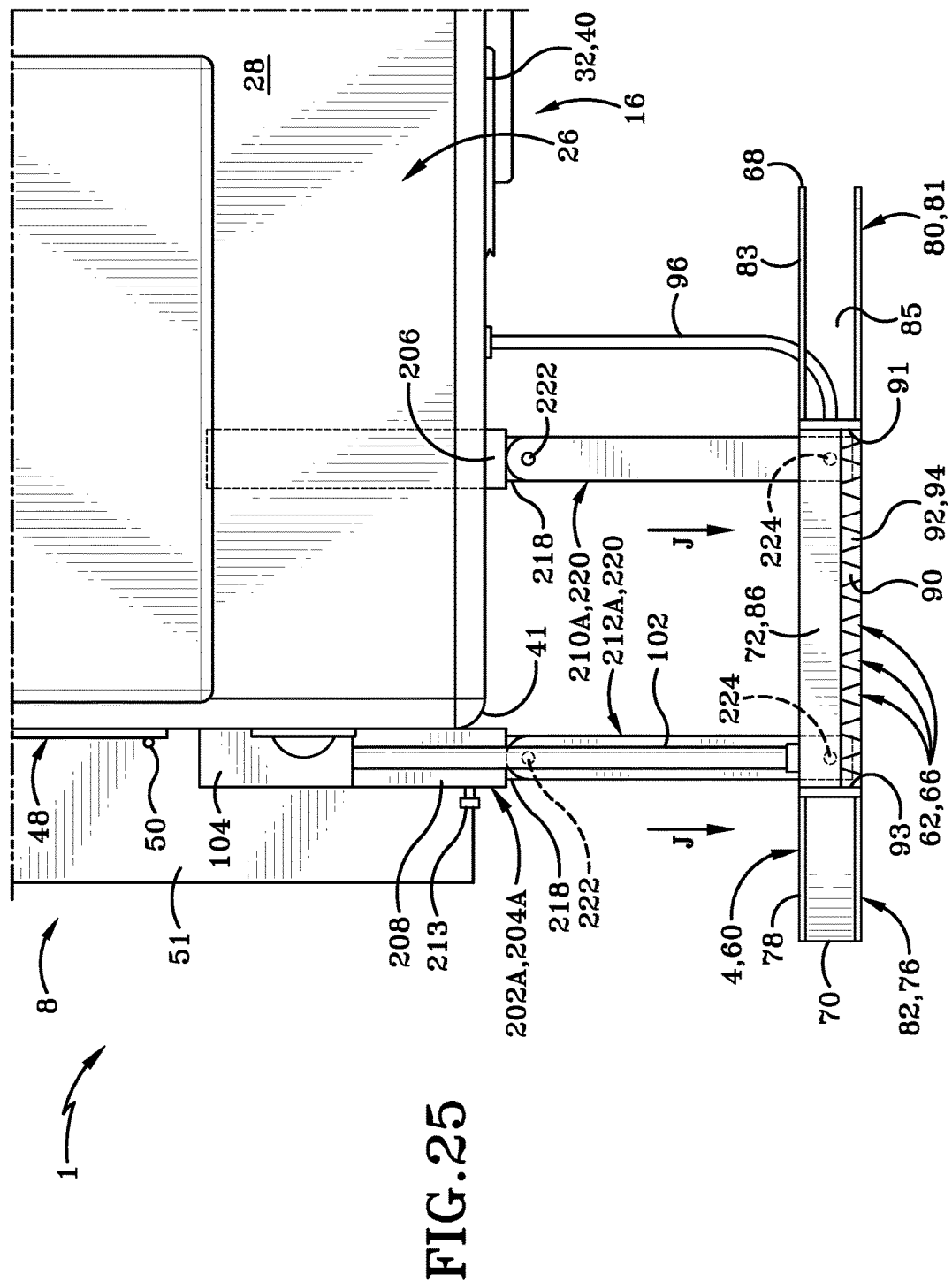
FIG. 25 is an enlarged top plan view of a right rear portion of the kiosk with the dispenser assembly mounted on an alternate set of telescoping arms and shown in an outward or extended position.
Figure 26:
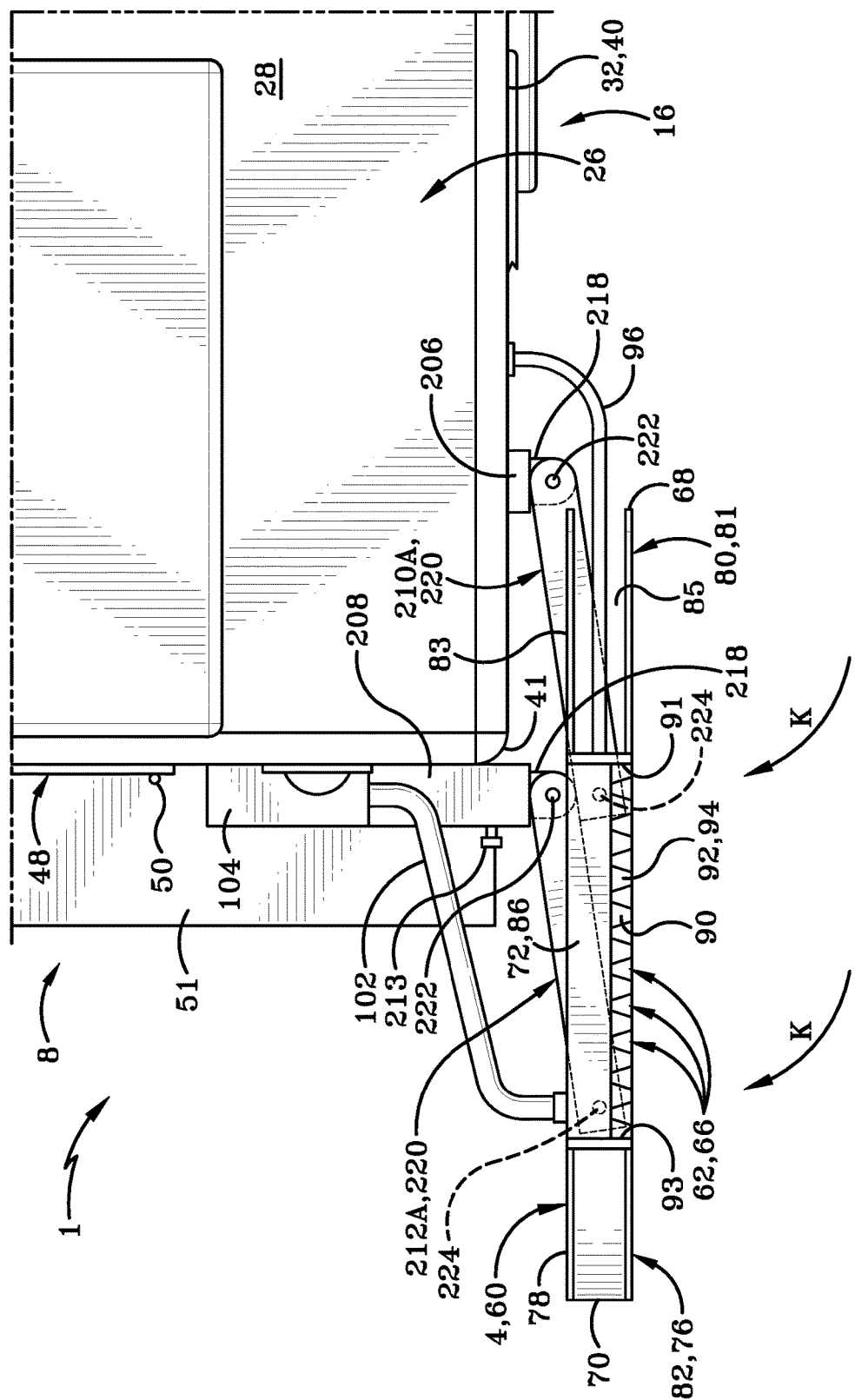
FIG. 26 is similar to FIG. 25 and shows the dispenser assembly in a rearward position.

Another embodiment is shown in FIGS. 25 and 26 which is similar to the previous embodiment using dispenser mounting assembly 202. For instance, the mounting assembly of FIGS. 25 and 26 may also have a track assembly which includes tracks 206 and 208. The track assembly may include front and rear sliders or arms 210A and 212A analogous to arms 210 and 212 of the previous embodiment. Arms 210A and 212A may be slidably received in tracks 206 and 208 to allow for the movement of the arms and dispenser assembly 4 between an inward position such as shown in FIGS. 21-23 of the previous embodiment and an outward position shown in FIG. 25. Each of arms 210A and 212A may include a first or inner segment 218 and a second or outer segment 220 which is pivotally mounted on segment 218 at an inner pivot or axis 222 which may be essentially vertical. Dispenser assembly 4 may be pivotally mounted on segments 220 at respective outer pivots or axes 224 which may be essentially vertical. Thus, axes 222 and 224 may be essentially vertical and parallel to one another. Each inner pivot/axis 222 may be adjacent the outer end of inner segment 218 and the inner end of outer segment 220. Each outer pivot/axis 224 may be adjacent the outer end of outer segment 220. The four pivots or axes 222 and 224 allow dispenser assembly 4 to swing rearwardly (Arrows K in FIG. 26) to a rearward position from the outward position shown in FIG. 25. This pivotal configuration may thus allow dispenser assembly 4 to remain in the same orientation in all of its positions. For instance, assembly 4, support 60 and walls 81 and 83 may be essentially parallel to walls 38 and 40 and perpendicular to wall 36 in all positions of assembly 4. During the pivotal movement from the outward position of FIG. 25 to the rearward position of FIG. 26, outer segments 220 pivot relative to inner segments 218 about inner pivots axes 222 and relative to dispenser assembly 4 at outer pivots/axes 224. The outer ends of outer segments 220 may move rearwardly and inwardly during this rearward pivotal movement of assembly 4.

In operation, the vendor may undertake the general previous steps discussed herein. With respect to the embodiment of FIGS. 25 and 26, the vendor or another person may apply force via hands to dispenser assembly 4 to move assembly 4 from the inward position (as illustrated in FIGS. 21-23) to the outward position of FIG. 25 (Arrows J) and then may pivot assembly 4 about the various pivots/axes as shown by Arrows K from the outward position to the rearward position of FIG. 26. Thus, the operator or another person may first move dispenser assembly 4 outward away from kiosk 1 via a linear movement of Arrows J, and then back toward kiosk 1 by pivotal movement shown by Arrows K. The rearward position shown in FIG. 26 is generally analogous to the rearward positions discussed in previous embodiments such that various relationships previously described may also apply here, although dispenser assembly 4 in the position of FIG. 26 may be spaced somewhat further outwardly than the previously described rearward positions and further outward than the inward position. In addition, front end 68 of assembly 4 may be forward of rear corner 41 or 39 and back wall 36. (It is further noted that if desired, assembly 4 may be moved forward from the outward position shown in FIG. 25 by pivotal movement in the opposite direction as shown by Arrows K such that dispenser assembly 4 may be positioned further forward of the inward position of FIGS. 21-23 and the outward position of FIG. 25.) When desired, the vendor or other person may pivotally move dispenser assembly 4 in the direction opposite Arrows K from the rearward position of FIG. 26 to the outward position of FIG. 25, then slide dispenser assembly 4 and arms 210A and 212A inwardly in a linear fashion in a direction opposite Arrows J to slide the arms into tracks 206 and 208 and move assembly 4 from the outward position of FIG. 25 to the inward position of FIGS. 21-23.

Another embodiment is shown in FIGS. 27-30 which includes a liquid topping dispenser assembly 230 which is similar to dispenser assembly 4 in some regards but different in other ways. Dispenser assembly 230 may be foldable or have sections or segments that fold or pivot relative to the other sections thereof. Assembly 230 may include a faucet mounting portion or section 231 which may be rigidly or fixedly secured to kiosk 1. Section or portion 231 may include upper arm 86 with faucets 62 mounted thereon as described in the previous embodiments, as well as lower arm 88. Section 231 may further include a front wall 232 and a rear wall 234 which extend between and are secured to upper and lower arms 86 and 88. Front wall 232 may be rigidly secured to the front ends of arms 86 and 88 while rear wall 234 may be rigidly secured to the rear ends of arms 86 and 88. Walls 232 and 234 may be essentially vertical as viewed from the side. Assembly 230 may include a front segment 80A which is generally analogous to front segment 80, and a rear segment 82A which is generally analogous to rear segment 82. While segment 82A has essentially the same or similar configuration as segment 82, front segment 80A differs from segment 80 in that it may include only a wall 81A which is analogous to wall 81, but not include an additional wall such as wall 83 described with respect to dispenser assembly 4. As noted above, section 231 may be rigidly or fixedly secured to kiosk 1. For instance, section 231 may be secured to rear wall 36 adjacent right rear corner 41 (or left rear corner 39) with fasteners extending from front wall 232 to back wall 36 and/or chassis 17. Alternately or in addition, a mounting structure may be secured to bumper 51 and extend upwardly and be secured to lower arm 88 of section 231. Section 231 may extend directly behind back wall 36.

Assembly 230 may further include a front hinge or axis 236 and a rear hinge or axis 238 such that axis 236 and 238 may be essentially vertical and parallel to one another. Front segment 80A may have opposed ends 68 and 240 and first and second sides or surfaces 242 and 244 which may be essentially vertical flat surfaces. Rear segment 82A may have opposed ends 70 and 246 and first and second sides or surfaces 248 and 250 which may be essentially vertical and flat and parallel to one another. Section 231 may include first and second sides or surfaces 252 and 254 which may be generally vertical and parallel to one another. Front segment 80A may be pivotally connected to section 231 via front hinge 236 to pivot back and forth about axis 236 between various positions including a rearward position shown in FIGS. 27 and 28 and a forward position shown in FIGS. 29 and 30. Similarly, rear segment 82A may be pivotally connected to the rear end of section 231/rear wall 234 via rear hinge 238 to pivot about the axis thereof between multiple positions including a forward position shown in FIGS. 27 and 28 and a rearward position shown in FIGS. 29 and 30.

Figure 27:
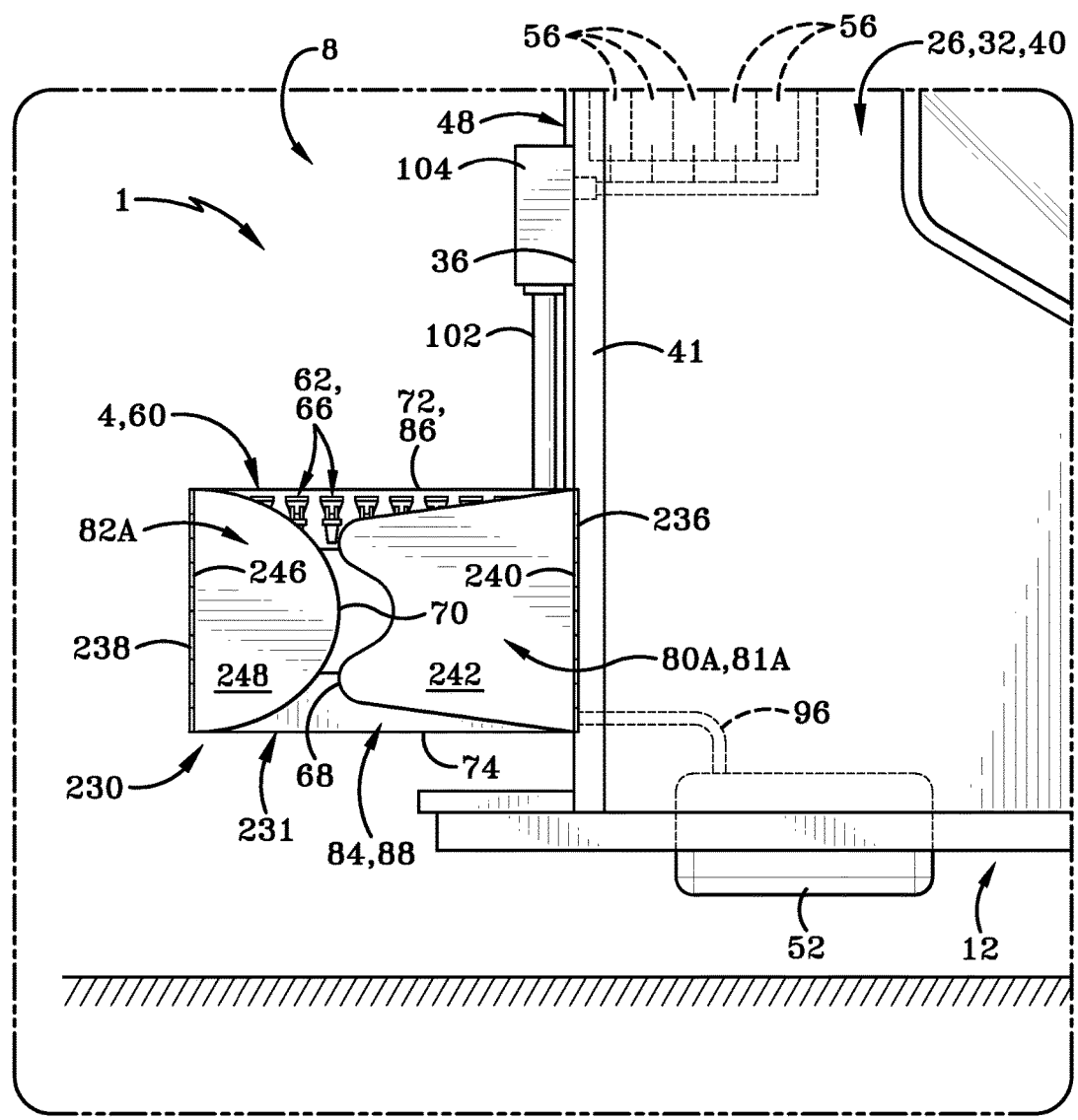
FIG. 27 is an enlarged right side elevation view of a right rear portion of the kiosk with an alternate dispenser assembly having foldable sections and shown in a stored or folded position.
Figure 28:
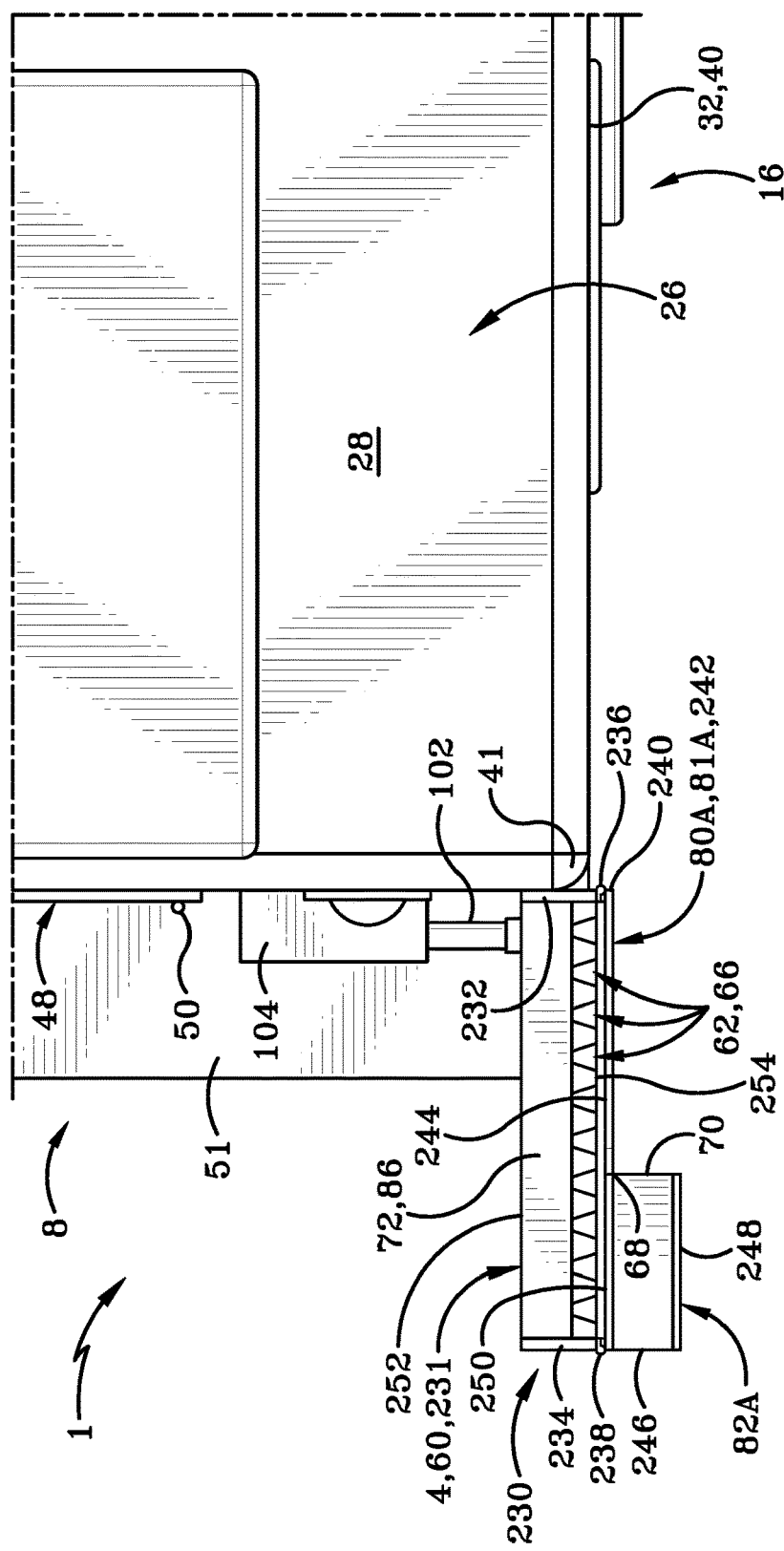
FIG. 28 is an enlarged top plan view of a right rear portion of the kiosk with the dispenser assembly in the position shown in FIG. 27.
Figure 29:
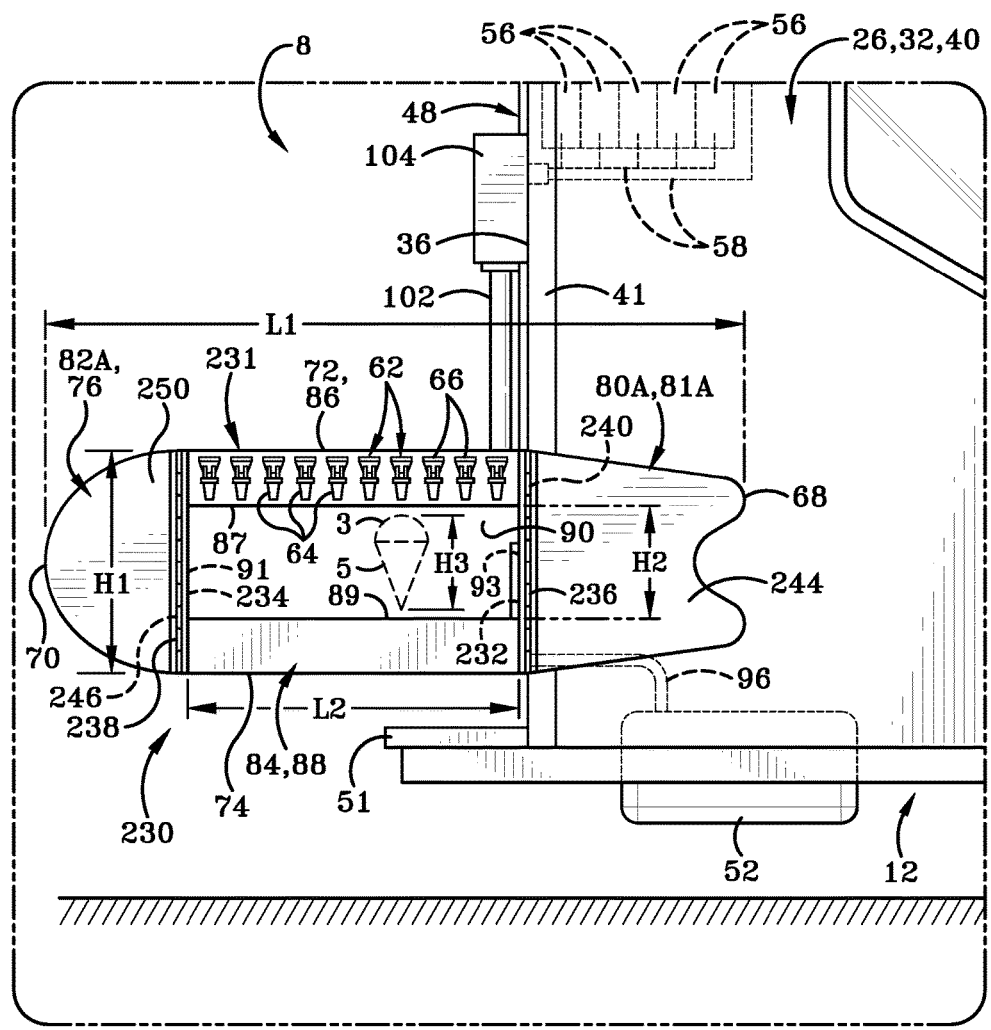
FIG. 29 is an enlarged right side elevation view similar to FIG. 27 showing the dispenser assembly in a dispensing or unfolded position.
Figure 30:
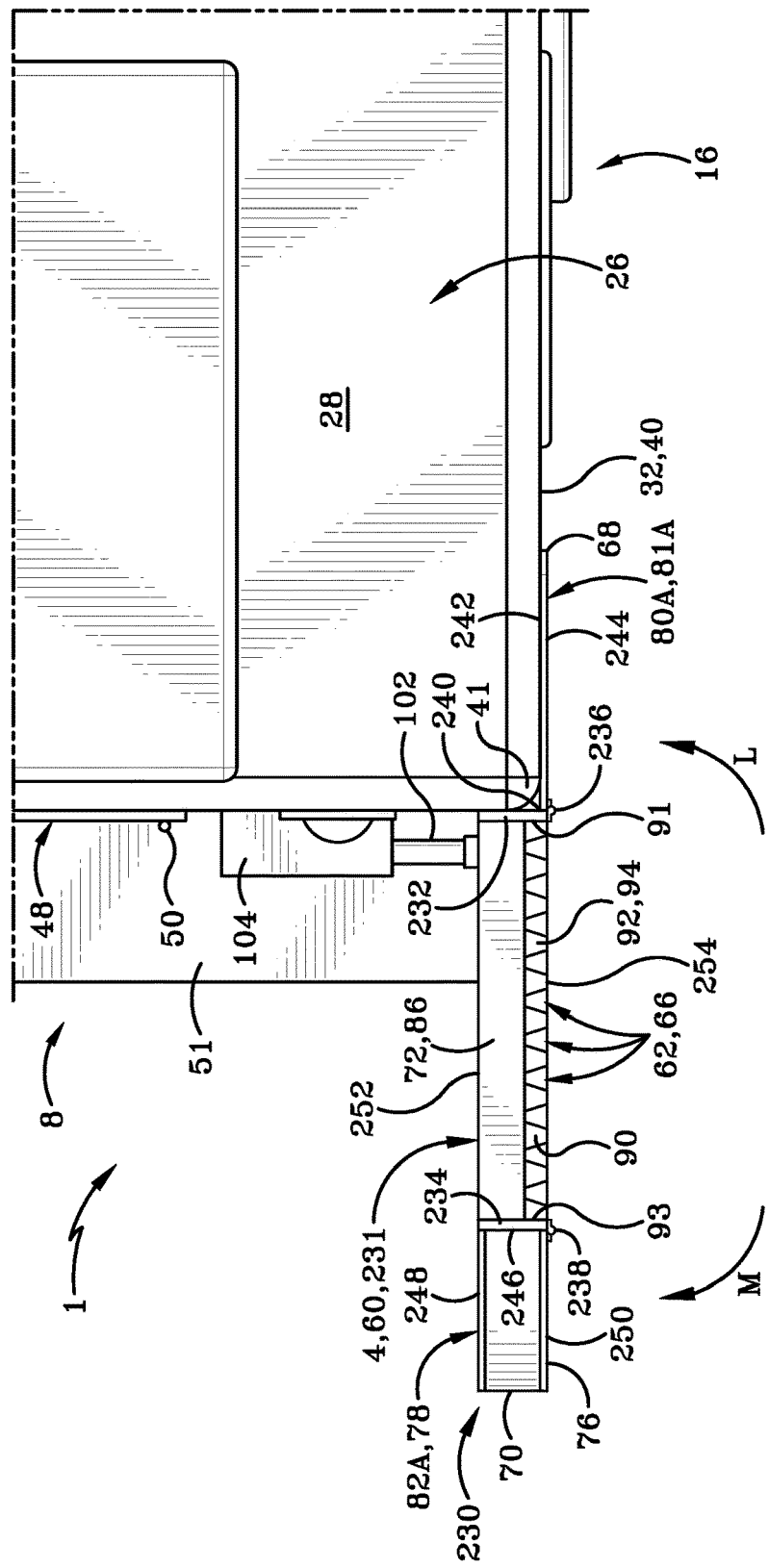
FIG. 30 is an enlarged top plan view similar to FIG. 28 showing the dispenser assembly in the position shown in FIG. 29.

Dispenser assembly 230 may have a folded, covered, stored or traveling position shown in FIGS. 27 and 28 and an unfolded, uncovered, deployed or dispensing position shown in FIGS. 29 and 30. In the covered position, front segment 80A may be in its rearward position and rear segment 82A may be in its forward position. In the uncovered position, front segment 80A may be in its forward position and rear segment 82A may be in its rearward position.

The present paragraph describes relationships which may exist between various components when dispenser assembly 230 is in the covered position. As viewed from the side (here from the right side in FIG. 27) segment 80A may cover, block access to or hide from sight a portion of section 231 including a portion of faucets 62, upper arm 86 and lower arm 88. End 68 may serve as the rear end of segment 80A and wall 81A, while end 240 may serve as the front end of segment 80A and wall 81A. Side or surface 244 of segment 80A/wall 81A may face and be closely adjacent to or in contact with side or surface 254 of section 231. Dispenser assembly 230 may have a front end which is defined by or adjacent front wall 232, hinge 236 and/or end 240 of wall 81A. Front hinge 236, end 240 of wall 81A and front wall 232 may be adjacent right corner 41 (or left corner 39) and rear hinge 238 and rear wall 234 may be distal and rearward of right corner 41 (or left corner 39). Wall 81A may be entirely rearward of left and right walls 38 and 40 and back wall 36. Wall 81A may be entirely outward of (here to the right of) section 231. Wall 81A may be directly to the right of (or left of) section 231. As viewed from the side, rear segment 82A may cover, block access to or hide from sight a portion of section 231 including a portion of faucets 62, upper arm 86 and lower arm 88. Side or surface 250 of rear segment 82A may face and be closely adjacent or in contact with side or surface 254 of section 231. Side or surface 248 of rear segment 82A may face away from and be spaced outwardly of side or surface 254 of section 231. End 70 may serve as the front end of segment 82A while end 246 may serve as the rear end of segment 82A. Dispenser assembly 230 may have a rear end adjacent or defined by rear wall 234, hinge 238 and/or end 246 of segment 82A. Rear segment 82A and section 231 may be entirely rearward of left and right walls 38 and 40 and back wall 36. Rear segment 82A may be entirely outward of (here to the right of) section 231. Ends 68 and 70 may be adjacent one another.

The present paragraph describes relationships which may exist between various components when dispenser assembly 230 is in the uncovered position. As viewed from the side (here from the right side in FIG. 29) segment 80A may not cover, block access to or hide from sight any portion of section 231 including any portion of faucets 62, upper arm 86 and lower arm 88. End 68 may serve as the front end of segment 80A and wall 81A, while end 240 may serve as the rear end of segment 80A and wall 81A. Segment 80A/wall 81A may be or extend directly outward of one of left and right walls 38 and 40 (here directly to the right of right wall 40). Side or surface 242 of segment 80A/wall 81A may face and be closely adjacent to or in contact with the outer surface of left or right wall 38 or 40 (here the right surface of right wall 40). Side or surface 244 may face away from the outer surface of the given left or right wall 38 and 40 (here the right surface of right wall 40). Dispenser assembly 230 may have a front end 68 which is defined by or adjacent front end 68 of wall 81A. Front hinge 236, end 240 of wall 81A and front wall 232 may be adjacent right corner 41 (or left corner 39) and rear hinge 238 and rear wall 234 may be distal and rearward of right corner 41 (or left corner 39). Wall 81A may be entirely forward of the back of back wall 36 and section 231, including the front of wall 232 and the front ends of arms 86 and 88. As viewed from the side, rear segment 82A may not cover, block access to or hide from sight any portion of section 231 including any portion of faucets 62, upper arm 86 and lower arm 88. Side or surface 250 of rear segment 82A may face outward (here rightward) and may be essentially coplanar with side 254 of section 231 and side 244 of wall 81A. Side or surface 248 of rear segment 82A may face inward (here leftward) and may be essentially coplanar with side 252 of section 231. End 70 may serve as the rear end of segment 82A while end 246 may serve as the front end of segment 82A. Dispenser assembly 230 may have a rear end 70 which may be directly behind section 231. Rear segment 82A and section 231 may be entirely rearward of left and right walls 38 and 40 and back wall 36. Rear segment 82A may be entirely directly behind section 231. End 246 may be closely adjacent or in contact with rear wall 234 and directly behind wall 234. Ends 68 and 70 may be distal one another.

The total horizontal longitudinal length of assembly 230 in the uncovered position, as measured between ends 68 and 70, may be substantially greater than the total length of dispenser assembly 230 in the covered position, as measured between the front and rear ends of assembly 230. In addition, assembly 230 may extend further rearward beyond back wall 36 in the uncovered position than in the covered position. Assembly 230 may also extend further forward in the uncovered position than in the covered position.

The general operation of the kiosk when using dispenser assembly 230 is similar to that described previously although dispenser assembly 230 does provide some different aspects compared to dispenser assembly 4. For instance, segments 80A and 82A may serve as doors or covers which block access to or partially block access to dispensers 62 in the covered position such that dispenser assembly 230 may not allow customers to access or use faucets 62 in the covered position. Thus, the vendor or other person may apply force to segments 80A and 82A to move them respectively from the covered position to the open position by pivotally moving segments 80A and 82A about respective hinges/axes 236 and 238 as illustrated by Arrows L and M respectively in FIG. 30. Respective latches may be provided to releasably secure segments 80A and 82A in the uncovered position. After assembly 230 has been moved to the uncovered position, faucets 62 may be used by customers to apply liquid toppings to the frozen confections. When the vendor is ready, he or she may apply force to segments 80A and 82A to move them pivotally to the covered position (opposite Arrows L and M) by pivoting them about hinges 236 and 238. Latches may be provided to releasably hold or secure segments 80A and 82A in the covered position.

It is noted that each dispenser assembly 4 and 230 described herein may in all positions thereof be entirely external to or outside box 26, sidewall 32, interior chamber 42 and kiosk 1. It is also noted that each of the embodiments shown may include mirror images of those shown such that they may be mounted on the left side of the kiosk (as partially described above) or include similar embodiments which may be at different locations and/or oriented differently. It is further noted that various components or terms having the same names described herein may be denoted as additional or other components, or first, second, third and fourth components, etc. For instance, various positions may be denoted as an additional position or another position or first, second, third, fourth, (etc) positions, and so forth. Other such components or terms may include, without limitation, portions, rails, flanges, dispenser assemblies, hoses, wheels, walls, rollers, openings, doors, corners, lines, faucets, spouts, surfaces, ends, frames, latches, catches and so forth.

In the foregoing description, certain terms have been used for brevity, clearness, and understanding. No unnecessary limitations are to be implied therefrom beyond the requirement of the prior art because such terms are used for descriptive purposes and are intended to be broadly construed. Moreover, the description and illustration is an example and not limited to the exact details shown or described.

The invention claimed is:

1. An apparatus comprising:
a kiosk comprising a sidewall defining an interior chamber having a size suitable for accommodating a person therein;
a frozen confection forming device in the interior chamber;
a serving window formed through the sidewall and configured to allow a frozen confection to pass through the window from the interior chamber to outside the kiosk;
an elongated slot with a closed first end and an open second end formed in the sidewall;
a track extending adjacent the sidewall;
a carriage which engages and is movable back and forth along the track; with a portion of the carriage disposed within the slot and wherein the portion of the carriage within the slot is movable into and out of the slot through the open second end; and
a liquid-topping dispenser assembly which comprises a support and a plurality of liquid-dispensing faucets carried by the support and operable by a person outside the kiosk; wherein the dispenser assembly is mounted on the carriage so that the dispenser assembly is movable back and forth with the carriage.

2. The apparatus of claim 1 wherein the carriage comprises a carriage frame and a tracking-engaging first roller which is rotatably mounted on the frame and rollingly engages the track.

3. The apparatus of claim 2 wherein the first roller is movable between a first position in which the first roller is entirely inside the sidewall and a second position in which the first roller is entirely outside the sidewall.

4. The apparatus of claim 1 wherein the sidewall comprises a back wall and one of a left wall and right wall which is secured to the back wall along a rear corner of the sidewall; and the open second end is adjacent the rear corner.

5. The apparatus of claim 4 wherein the slot is formed in the one of the left wall and right wall.

6. The apparatus of claim 5 further comprising a cutout formed in the back wall adjacent the open second end of the slot; wherein the carriage is movable within the cutout.

7. The apparatus of claim 1 further comprising a drip pan carried by the support below the faucets; and a drain tube which is in fluid communication with the drip pan and extends through the slot.

8. The apparatus of claim 1 wherein the carriage is movable between a first position in which a portion of the carriage is inside the sidewall and a second position in which the portion of the carriage is outside the sidewall.

9. The apparatus of claim 8 wherein the track includes a first portion inside the sidewall and a second portion outside the sidewall.

10. The apparatus of claim 9 further comprising a cutout formed in the sidewall; wherein the track includes a third portion within the cutout.

11. The apparatus of claim 1 wherein the track includes a first portion inside the sidewall and a second portion outside the sidewall.

12. The apparatus of claim 1 wherein the kiosk has a floor and defines a subfloor space; and a portion of the carriage is movable within the subfloor space.

13. The apparatus of claim 1 wherein the dispenser assembly is outside the sidewall in all positions of the dispenser assembly.

14. The apparatus of claim 1 wherein the dispenser assembly is pivotable relative to the kiosk.

15. The apparatus of claim 1 further comprising a pivot assembly which is mounted on the carriage and by which the dispenser assembly is pivotally mounted on the carriage so that the dispenser assembly is pivotable relative to the carriage and sidewall.

16. The apparatus of claim 1 wherein the track comprises a curved portion so that the carriage moves in an arcuate path when the carriage moves along the curved portion.

17. An apparatus comprising:
a kiosk comprising a sidewall and a rear wall defining an interior chamber having a size suitable for accommodating a person therein;
a frozen confection forming device in the interior chamber;
a serving window formed through the sidewall and configured to allow a frozen confection to pass through the window from the interior chamber to outside the kiosk;
a track extending inside and parallely adjacent to the sidewall;
a carriage comprising a carriage frame having a dispenser mounting portion and a roller mounting portion, wherein a roller is rotatably mounted on the roller mounting portion and rollingly engages the track inside the sidewall; and
a liquid-topping dispenser assembly which comprises a support and a plurality of liquid-dispensing faucets carried by the support and operable by a person outside the kiosk, wherein the dispenser assembly is mounted on the carriage so that the dispenser assembly is parallel to and exterior of the sidewall and movable back and forth with the carriage while the dispenser assembly remains parallel to and exterior of the sidewall, and forward of the rear wall.

18. An apparatus comprising:
a kiosk comprising a sidewall defining an interior chamber having a size suitable for accommodating a person therein;
a frozen confection forming device in the interior chamber;
a serving window formed through the sidewall and configured to allow a frozen confection to pass through the window from the interior chamber to outside the kiosk;
a track;
a carriage comprising a first portion and a second portion;
a liquid-topping dispenser assembly which comprises a support and a plurality of liquid-dispensing faucets carried by the support and operable by a person outside the kiosk, wherein the dispenser assembly is mounted on the carriage so that the dispenser assembly is movable with the carriage;
an elongated slot formed in the sidewall; and
a cutout formed in the sidewall;
wherein the carriage is movable back and forth along the track so that the first portion of the carriage is movable from a first position of the first portion inside the sidewall through the cutout to a second position of the first portion outside the sidewall and so that the second portion of the carriage is movable from a first position of the second portion inside the slot to a second position of the second portion outside the slot.

* * * * *